United States Patent [19]

Karkau

[11] 4,270,630
[45] Jun. 2, 1981

[54] AUTOMATIC LIFT ASSEMBLY

[75] Inventor: Lawrence E. Karkau, Lansing, Mich.

[73] Assignee: Collins Industries, Inc., Hutchinson, Kans.

[21] Appl. No.: 62,788

[22] Filed: Aug. 1, 1979

Related U.S. Application Data

[63] Continuation-in-part of Ser. No. 855,288, Nov. 28, 1977, Pat. No. 4,164,292.

[51] Int. Cl.³ .......................... B66B 9/20; B62B 1/06
[52] U.S. Cl. .................................. 187/9 R; 414/545; 414/921; 105/447
[58] Field of Search ............... 414/545, 921; 187/9 R; 105/447–448; 280/163, 164 R, 166

[56] References Cited

U.S. PATENT DOCUMENTS

| | | | |
|---|---|---|---|
| 4,027,807 | 6/1977 | Thorley | 414/545 |
| 4,124,096 | 11/1978 | Dudynskyj et al. | 414/539 X |
| 4,124,100 | 11/1978 | Hawks | 187/9 R |
| 4,164,292 | 8/1979 | Karkau | 414/545 |

Primary Examiner—Robert W. Saifer
Assistant Examiner—R. B. Johnson
Attorney, Agent, or Firm—Miller, Morriss & Pappas

[57] ABSTRACT

An improved automotive lift device for vehicles which consists of a lift carriage having movable upper step and riser elements so as to selectively form normal upper and lower entrance steps in their retracted normal use position. The upper step and riser pivotally connected thereto are selectively extendable outwardly and downwardly by self-contained actuating device so as to form a continuous horizontal loading platform in association with the fixed lower step formed by the base of the lift carriage. Thus formed, the horizontal loading platform can be selectively lowered to the ground or curb level. It can be also selectively raised to the vehicle interior floor level thereby enabling a handicapped person, on crutches or in a wheelchair, to easily board or disembark from such vehicle at will. The riser element which is pivotally connected to the movable upper step is freely pivotal below the horizontal so as to compensate for uneven ground during the loading operation and can be selectively raised to form a fixed horizontal co-planar extension of the loading platform so as to enlarge the capacity thereof in use. An elongate safety guard plate is pivotally connected to the outer edge of the riser and is normally retracted thereagainst when not in use. When the loading platform is in use, the safety guard plate is selectively moved to a raised vertical position along the outer edge of the riser so as to act as a safety guard to prevent wheelchairs and the like from inadvertently rolling off of the platform.

3 Claims, 33 Drawing Figures

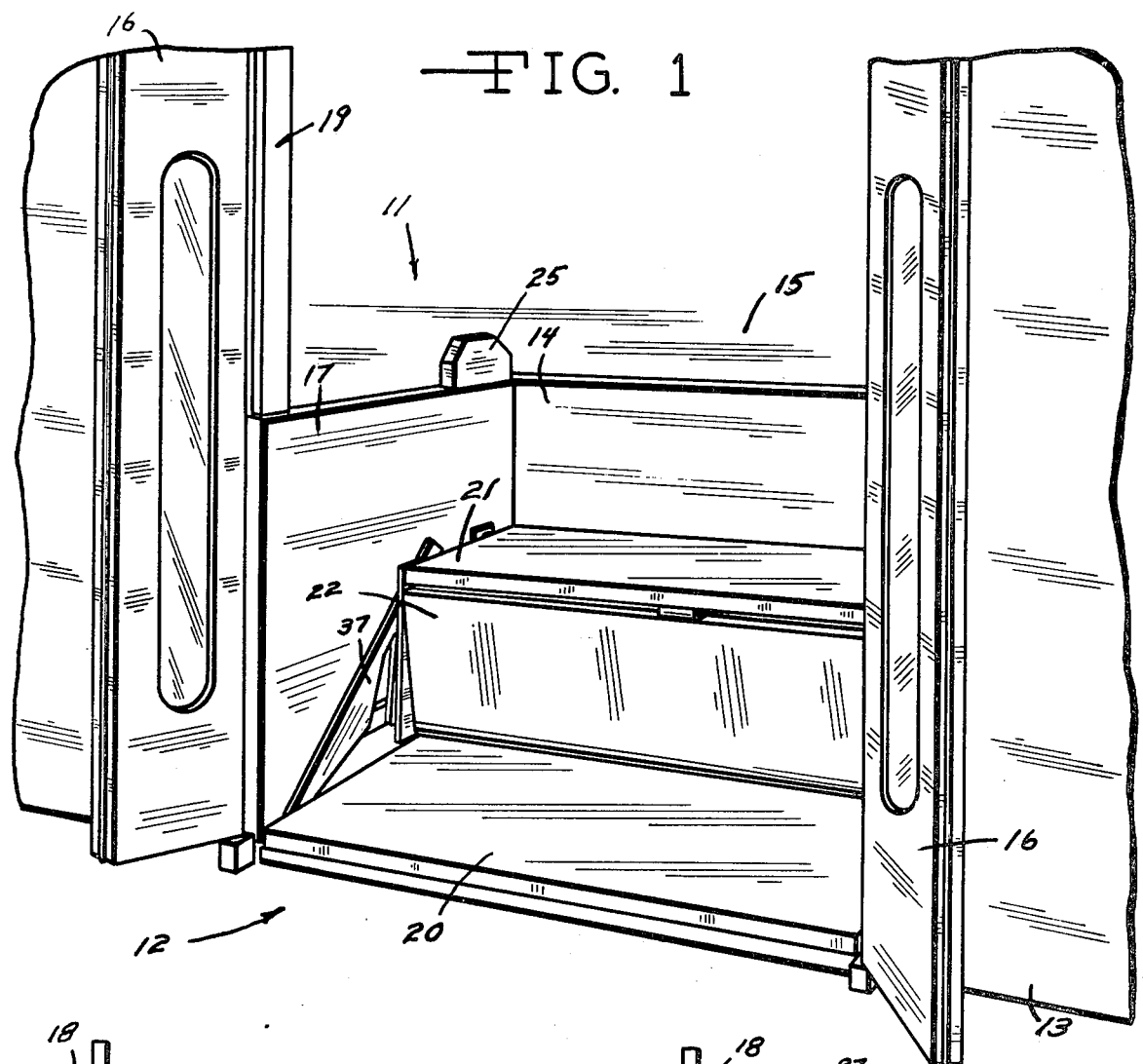
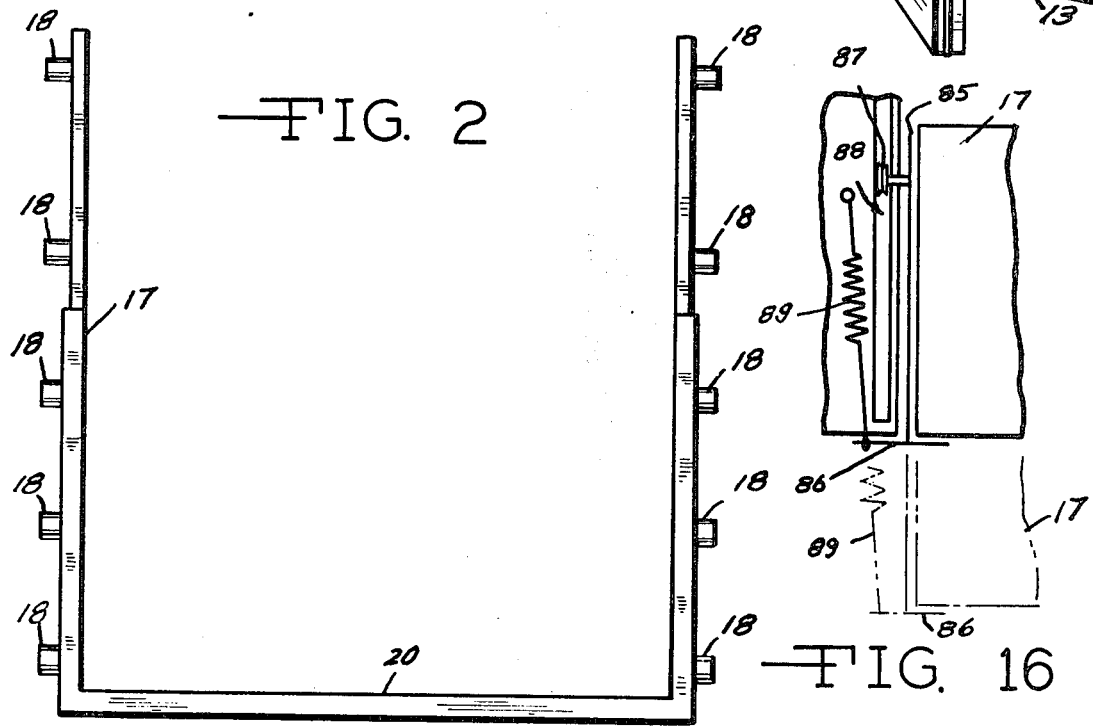

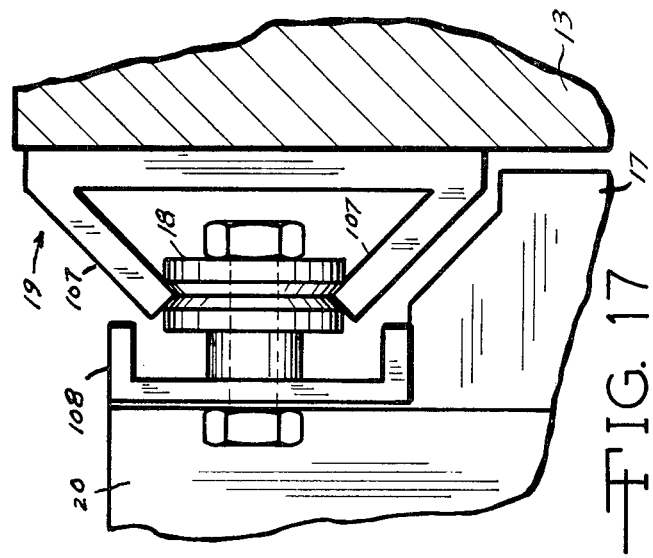
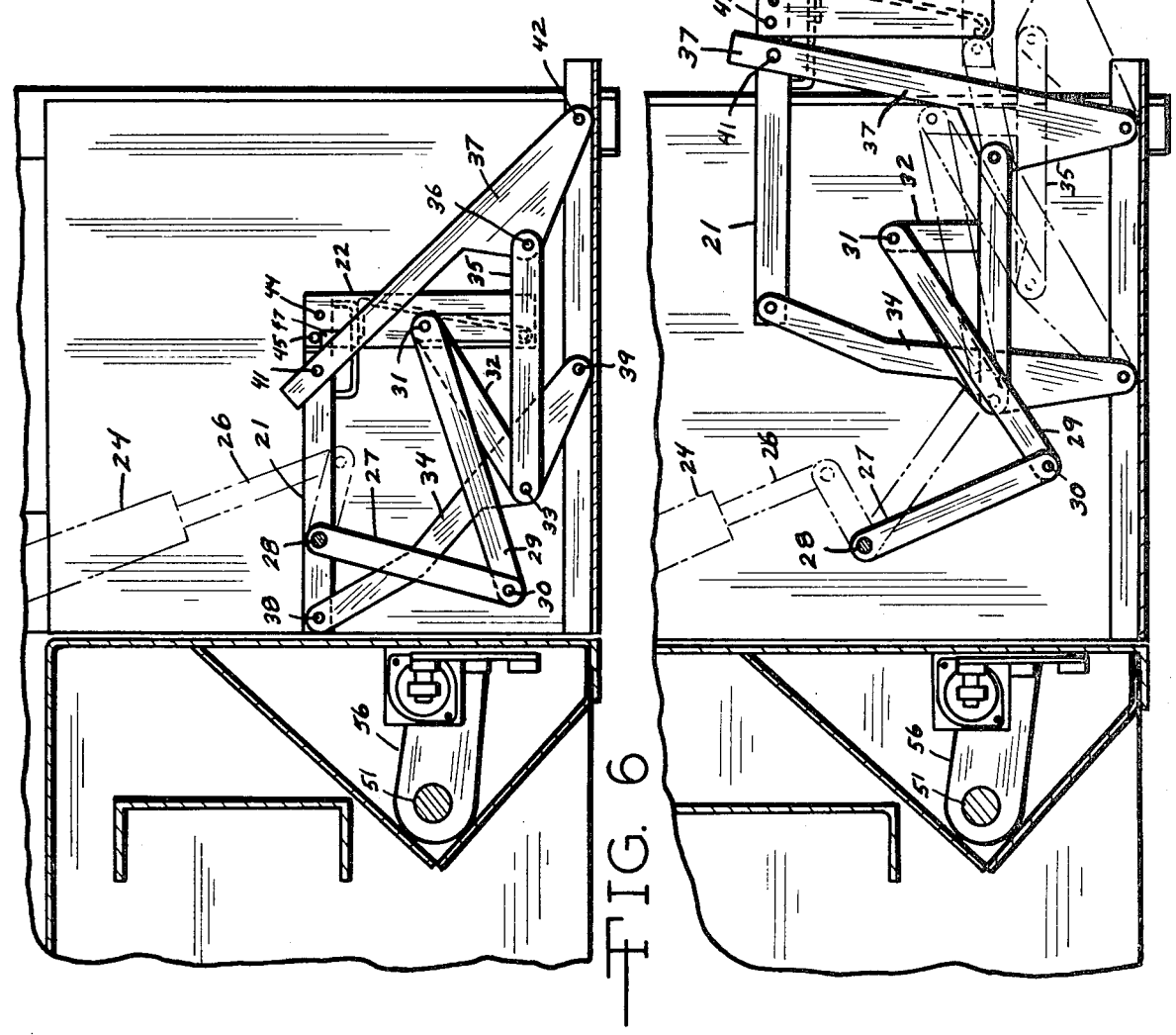

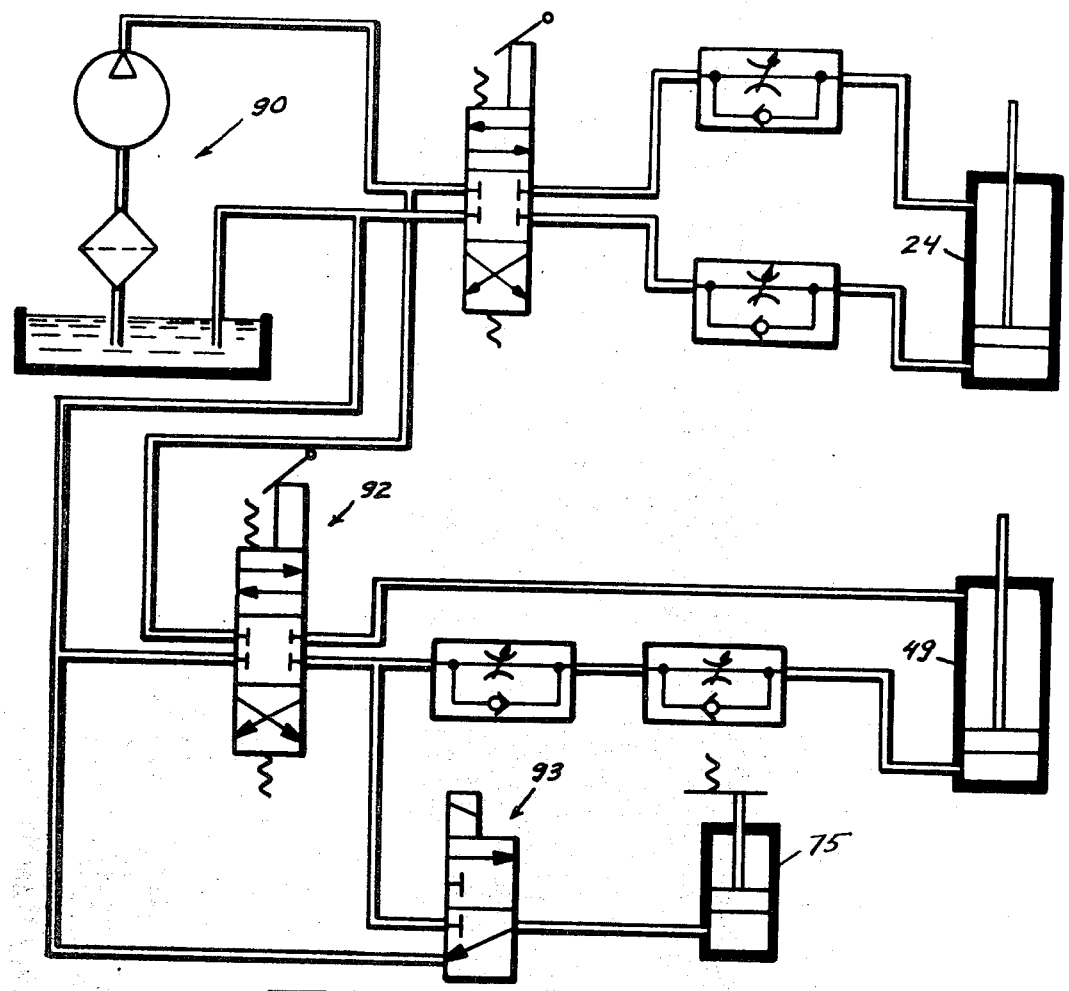
FIG. 13
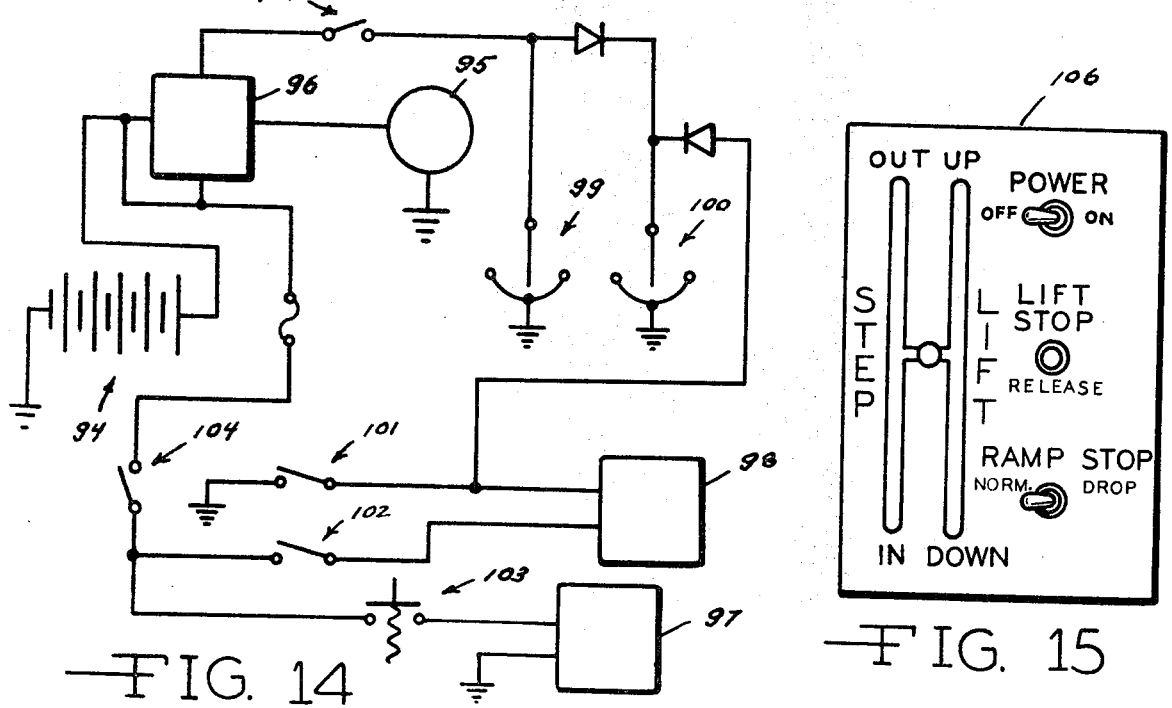
FIG. 14
FIG. 15

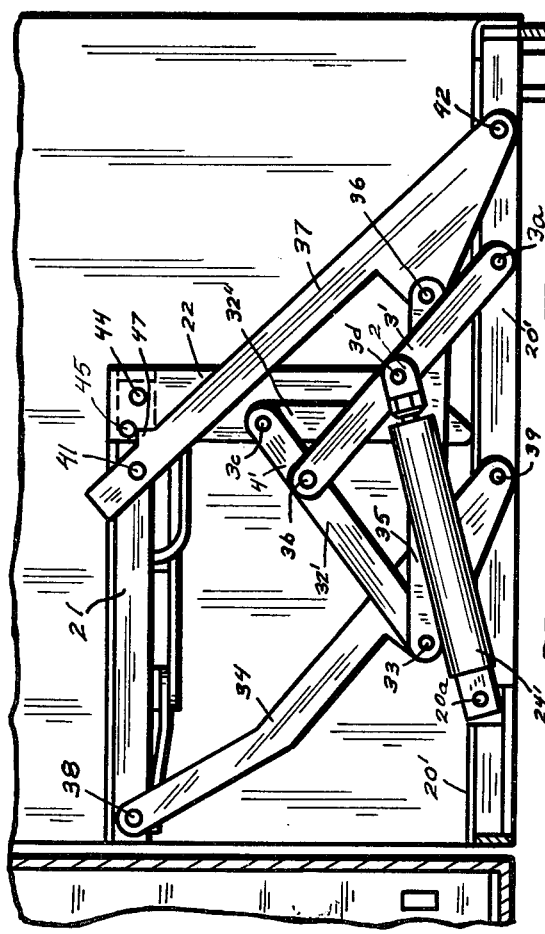
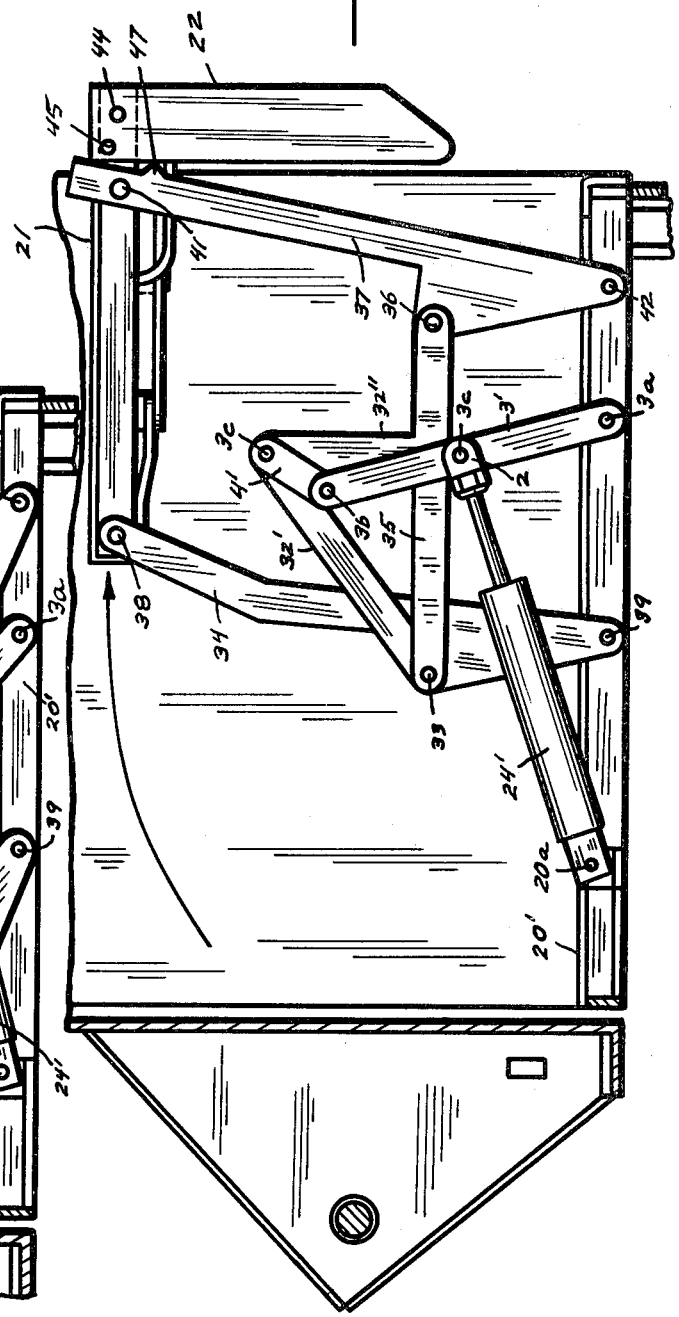

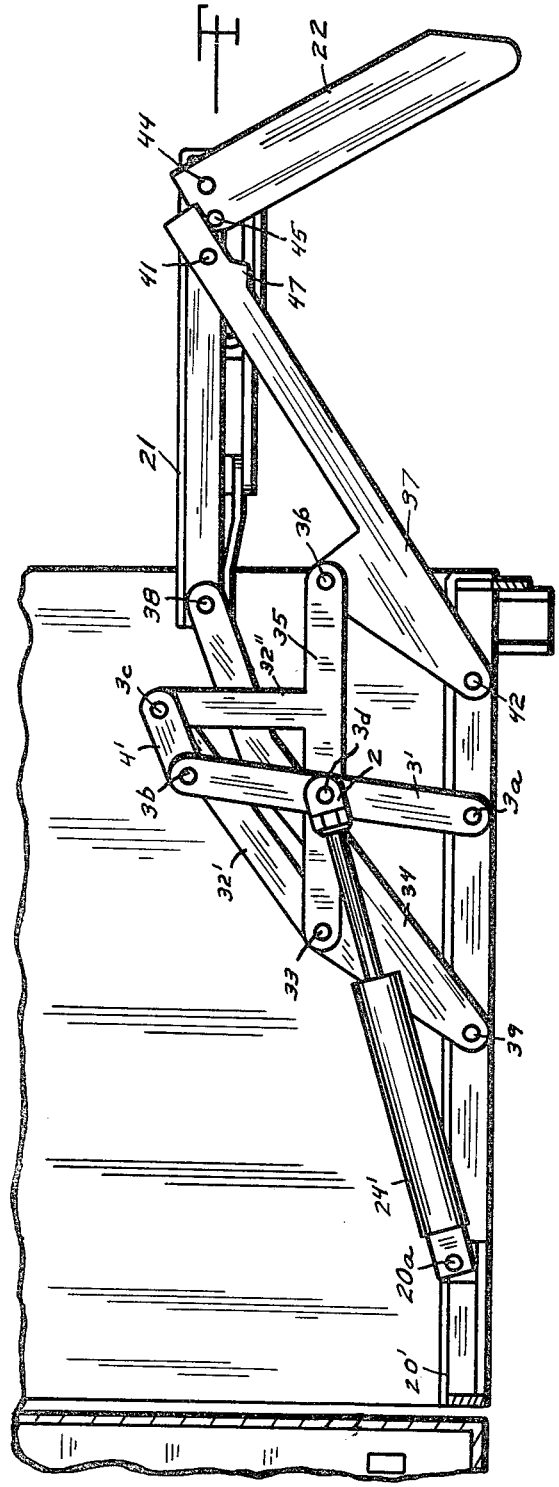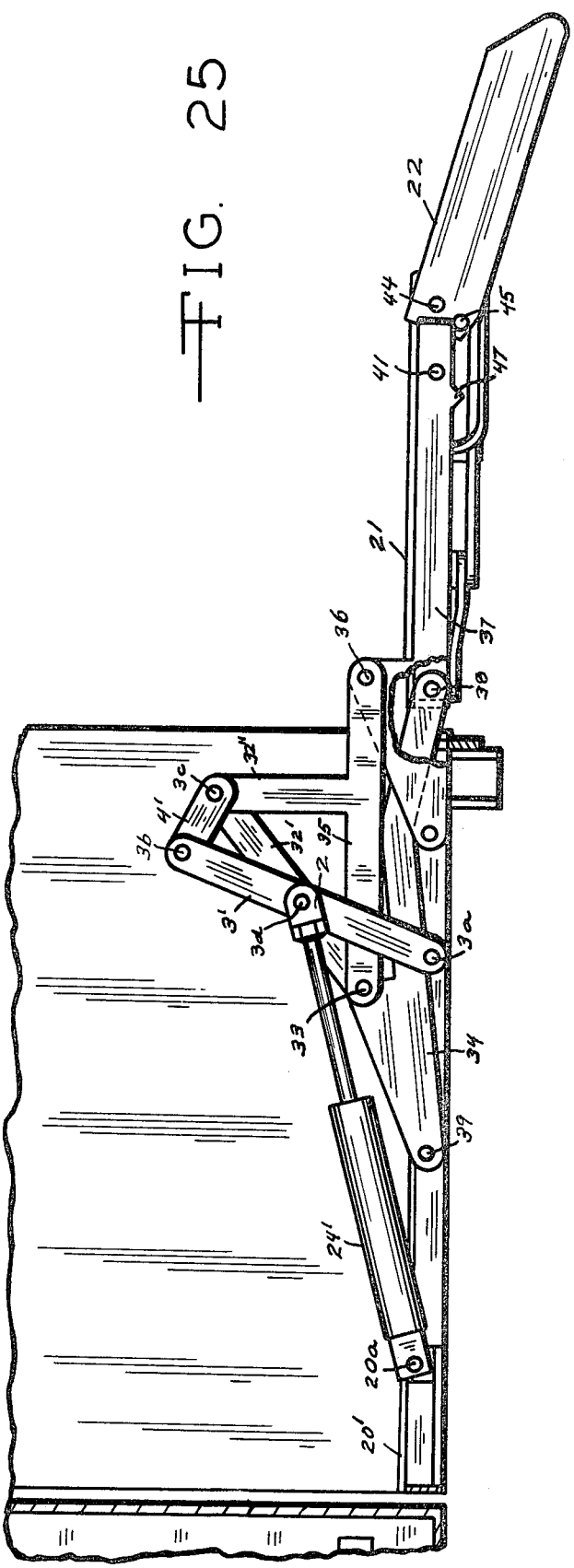

AUTOMATIC LIFT ASSEMBLY

CROSS REFERENCE TO RELATED APPLICATION AND PATENT

This application is a continuation-in-part of patent application, Ser. No. 855,288, filed Nov. 28, 1977, now U.S. Pat. No. 4,164,292, issued Aug. 14, 1979.

SUMMARY OF THE INVENTION

This invention relates to an improved automatic lift device for use in association with doorway openings of buildings or of vehicles such as buses and vans so as to facilitate the loading and unloading of handicapped persons into and out of such buildings and/or vehicles.

More specifically, the invention relates to an improved automatic lift device which consists of a lift carriage that is mounted within the doorway opening so as to be vertically movable therein. Movable step and riser elements are provided within the lift carriage so as to form normal upper and lower entrance steps in their retracted normal use position. The lift carriage is selectively movable to a lowered ground level position and a raised interior floor level position while the upper step and riser remain in their retracted normal step position within the lift carriage. The upper step and riser pivotally connected thereto are selectively extendable outwardly and downwardly by self-contained actuating means mounted solely on the base of the lift carriage. Thus actuated, the upper step and riser form a continuous horizontal loading platform in association with the fixed lower step formed by the base of the lift carriage. Thus formed, the horizontal loading platform can be selectively lowered to the ground or curb level or to any level intermediate thereto. It can be also selectively raised to the interior vehicle floor level thereby enabling a handicapped person, on crutches or in a wheelchair, to easily board or disembark from such vehicles at will. The riser element which is pivotally connected to the movable upper step is freely pivotal below the horizontal so as to compensate for uneven ground during the loading operation. The riser is then selectively raised to form a fixed horizontal co-planar extention of the loading platform so as to enlarge the capacity of the loading platform during the actual lifting and lowering operation. An elongate safety guard plate is pivotally connected to the outer edge of the riser and is normally retracted thereagainst when not in use. After a wheelchair has been moved onto the loading platform, the safety guard plate can be selectively pivotally moved to a raised vertical position along the outer edge of the riser so as to act as a guard against inadvertent movement of a wheelchair or other equipment from the expanded platform while the platform is being raised to the level of the vehicle inside floor or is being lowered to the ground level.

It is thus seen that a highly utilitarian automatic lift device for vehicles is provided which consists of a vertically movable lift carriage which is easily mounted within a recess well of a doorway opening. The lift carriage is provided with normal steps which comprise a fixed lower step and a movable upper step and riser pivotally connected thereto. In its retracted normal use position, the upper step is positioned to the rear of the lift frame and the pivotally connected riser extends vertically downward to the fixed lower step formed by the base of the lift carriage. The safety guard plate is pivotally retracted against the lower portion of the vertically-oriented riser when not in use.

It is thus seen that an improved automatic lift device is provided which includes a lift carriage which is provided with a normal step structure which can be selectively converted to a horizontal loading platform by an outward and downward movement of the upper step and concurrent upward movement of the riser pivotally connected thereto. During loading operations, the safety guard plate remains horizontally retracted against the riser so that a wheelchair can easily pass thereover while the riser is in its freely pivotal loading ramp position. This simplicity of structure and movement is not found in the devices of the prior known art.

It is further seen that an improved automatic lift device is provided wherein the riser is maintained in a fixed horizontal position during the raising and lowering of the lift carriage so as to form a co-planar extension of the lower step and extended upper step, thus forming an enlarged loading platform.

It is further seen that an improved automatic lift device is provided wherein the upper step and riser are provided with actuating means which are entirely self-contained and mounted solely upon the base of the lift carriage.

It is further seen that an automatic lift device is provided which includes a lift carriage that can be selectively lowered to ground level or raised to interior floor level with the step assembly in its retracted normal use position or selectively extended to form a loading and unloading platform in connection with the base of the lift carriage.

It is therefore an object of this invention to provide an automatic door lift for doorway openings having a vertical movable lift carriage that can be easily installed in the doorway openings of buildings and of vehicles such as buses and vans.

Another object of this invention is to provide an automatic door lift having a lift carriage provided with a movable upper step and riser pivotally connected thereto and selectively extendable therefrom to form a loading platform.

Still another object of this invention is to provide an automatic door lift which is provided with an upper step and a riser which can be selectively converted into a loading platform which can be lowered to ground level to receive a handicapped person on crutches or in a wheelchair and which can then be raised to deliver such person to the interior floor level of the vehicles.

Yet another object of the invention is to provide an automatic door lift having a selectively retractable and extendable step structure which utilizes a movable riser to form a horizontal extension portion of the loading platform and which riser is provided with a safety guard plate which can be selectively actuated to form a raised vertically-oriented wheelchair saftey guard or stop along the outer edge of the platform while the loading platform is moving vertically and which is retracted against the riser when it is not in use.

Another object of this invention is to provide a highly utilitarian improved automatic door lift for vehicles which has a minimum of moving components and which in use requires no ancillary components other than the existing upper step and riser elements and self-contained actuating means therefor to convert from the retracted normal step configuration to the extended loading platform configuration.

The improved automatic lift structure is thus simple in design and has a minimal number of movable components in the operation thereof. Further, it does not require any ancillary components or extensions in the operation thereof and is provided with an enlarged lift platform during the raising and lowering of the lift carriage. The enlarged lift platform is provided with a safety guard element along the outer edge thereof.

The lift structures of the prior known art are highly complicated, both in structure and in operational movement. In addition, they utilize components which are ancillary to the normal step structures in order to provide safety guards incident to the safe operation of the lift. Representative examples of such prior art devices are seen in the U.S. Pat. Nos. 4,027,807 to Thorley, Maroshick 3,913,497, Abreu 4,026,387, Pohl 3,984,014, Perkins 4,007,844 and Wark 3,918,596.

Other objects will be apparent to those skilled in the art upon reading the present description, drawings and claims.

IN THE DRAWINGS

FIGS. 1 through 17 pertain to the embodiment of the Automatic Lift Assembly invention shown and claimed in the earlier co-pending application, Ser. No. 855,288, filed Nov. 28, 1977 and are incorporated hereinto by reference.

FIGS. 18 through 32 pertain to the improvements to the Automatic Lift Assembly which is the subject matter of this continuation-in-part application.

FIG. 1 is a perspective view of the automatic lift assembly showing the lift assembly in its use position in a vehicle door opening with the upper step and riser retracted into their normal step use position.

FIG. 2 is a front elevation view of the substantially U-shaped lift carriage showing the roller means which engage the vertical track means provided along each side of the vehicle door opening.

FIG. 6 is a schematic side elevation view showing the step extending actuating linkage means in their retracted position.

FIG. 7 is a schematic side elevation view of the step extending actuating linkage means illustrating the step and riser being progressively pivotally extended and lowered to form the loading platform and ramp.

FIG. 13 is a schematic flow diagram showing the hydraulic control system.

FIG. 14 is a schematic diagram showing the electrical control circuitry.

FIG. 15 is a plan view of the actuating control panel for the automatic lift assembly.

FIG. 16 is a schematic end view of the lift shield assembly.

FIG. 17 is a schematic cross-sectional view of the vertical track assembly.

FIG. 22 is a schematic side elevation view of the improved self-contained step extending actuating linkage means in their retracted position with the upper step and riser retracted into their normal step use position.

FIGS. 23 through 25 are schematic side elevation views of the improved step extending actuating linkage means illustrating the step and riser being progressively pivotally extended and lowered to form the loading platform and with the riser in its lowered freely pivotal loading ramp position.

FIG. 27A is a partial schematic view showing the riser (ramp) actuating assembly in its retracted position.

GENERAL DESCRIPTION

Figure 3:
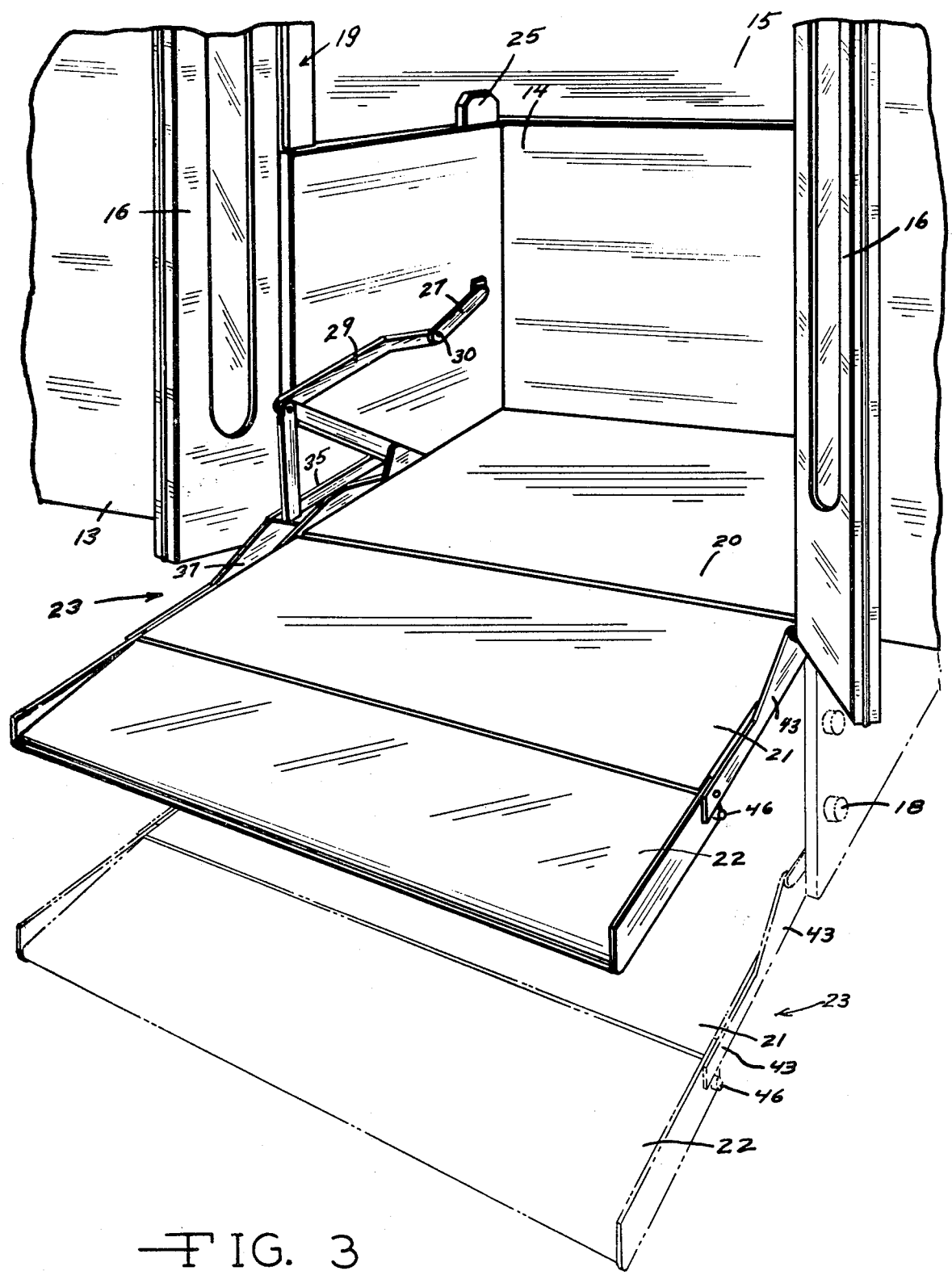
FIG. 3 is a perspective view of the automatic lift assembly illustrating the step and riser extended to form a loading platform and ramp and showing the lift carriage and platform in phantom line lowered to the ground level loading position.

An improved automatic lift assembly is provided for use in vehicle or building doorways which consists of a lift carriage movably positioned within a doorway opening. The lift carriage has a substantially U-shaped configuration wherein the horizontal base thereof is adapted to form a lower step portion. A movable upper step is pivotally positioned with the lift carriage in a normally retracted stowed step use position above and to the rear of the lower step portion. The upper step is selectively extendable forwardly and downwardly so as to form a co-planar platform extension of the lower step portion. A movable riser is provided in pivotal engagement with the upper step so as to selectively extend vertically downwardly to the lower step portion when the upper step is in its retracted stowed step use position within the lift carriage. The riser is selectively extended upwardly and outwardly to form a freely pivotal loading ramp extension from the extended upper step. The improved automatic lift assembly is provided with self-contained upper step and riser actuating means which are mounted on the base of the lift carriage and which selectively extend and retract the upper step and riser without attachment to any ancillary surfaces or structures. Further, the improved automatic lift assembly is provided with enlarged carrying platform during the lifting and lowering of the lift carriage. The enlarged carrying platform is formed by the base of the lift carriage, the extended upper step and the riser which forms a horizontal co-planar extension of the upper step. In the earlier embodiment of the invention, the riser was inclined upwardly during the lifting and lowering of the lift carriage, thereby decreasing the capacity of the carrying platform. A safety guard barrier plate is pivotally connected to the riser along the outer longitudinal edge thereof. The barrier safety guard plate is pivoted flat against the riser when not in use and is adapted to be pivoted to a vertical use position when the riser is moved to its horizontal platform extension use position. The safety guard plate acts as a safety guard barrier for wheelchairs and the like which have been loaded onto the enlarged platform formed by the extended upper step and riser. Lift carriage actuating means are provided to selectively lower the lift carriage to ground level and to selectively raise the lift carriage to the interior floor level of the building or vehicle. As in the earlier embodiment of the invention shown in FIGS. 1 through 17, the improved embodiment of the invention is provided with lift carriage actuating means which include a main pivot actuator shaft positioned behind the lift carriage. The pivot actuator shaft is provided with a pair of fixed spaced-apart pivot support arms which bracket and are in pivotal link engagement with the lift carriage. The actuator shaft is selectively rotatable so as to selectively raise and lower the lift carriage.

The main pivot actuator shaft is selectively rotated by a hydraulically-operated steering gear power unit. The steering gear power unit is adapted to translate the linear motion of the piston provided therein to rotary motion to drive the main pivot actuator shaft. Safety stop assembly means are provided in the doorway opening in selective engagement with the pivot support arms so as to support the lift carriage in its intermediate normal use position. The safety stop assembly means are selectively retractable out of engagement with the pivot support arms so as to permit selective raising and lowering of the lift carriage.

In the improved embodiment of the invention, riser actuating means are provided in association with the movable upper step and the pivotally movable riser to selectively move the riser from its downwardly depending loading ramp position to its fixed horizontal position to form co-planar extension of the loading platform. Safety guard barrier plate actuating means are provided in association with the riser actuating means to selectively pivot the barrier plate to its vertical guard position along the outer longitudinal edge of the horizontally extending riser. Control panel actuating means are provided to selectively control the lift carriage actuating means, the movable upper step and riser pivotally connected thereto, the safety stop assembly means and the riser and barrier plate actuating means.

SPECIFIC DESCRIPTION OF A PREFERRED EMBODIMENT

As shown in FIG. 1, the automatic lift assembly 11 is mounted in the door opening 12 of the vehicle 13. The automatic lift assembly 11 is mounted within a step well recess 14 provided in the vehicle floor 15 and is vertically movable therein. Thus positioned, the automatic lift assembly 11 does not interfere with the normal operation of the vehicle door 16. The automatic lift consists of a substantially U-shaped metal lift carriage 17 which is provided with vertically aligned rollers 18 on each side thereof which are adapted to slidably engage vertical track body guides 19 which are mounted along each side of the door opening. As shown in FIG. 1, the base of the lift carriage 17 forms the lower step 20. The improved embodiment of the invention is similarly shown in FIG. 18.

Figure 4:
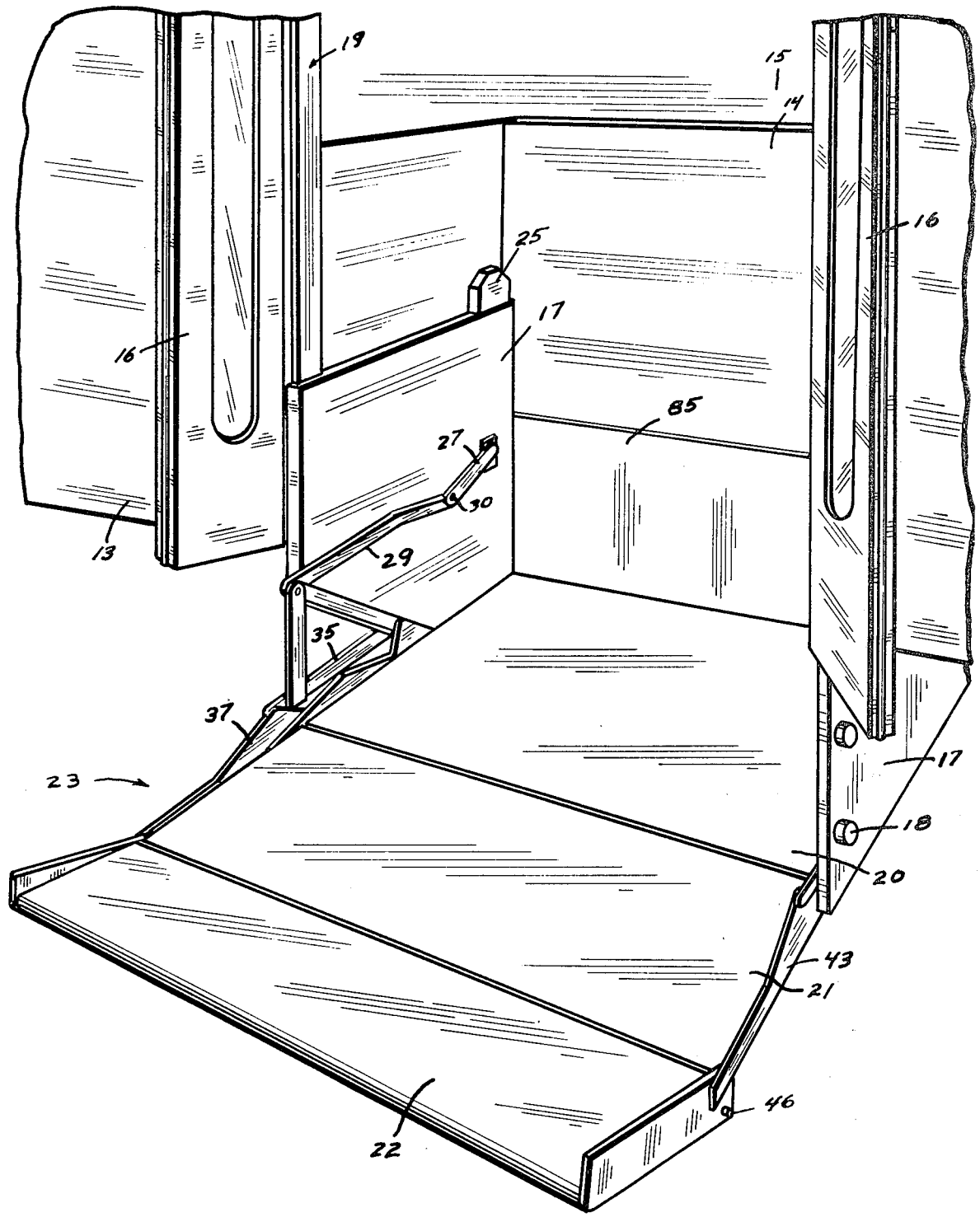
FIG. 4 is a perspective view of the automatic lift assembly in its lowered ground level loading position with the riser element in its upwardly inclined safety guard position.
Figure 19:
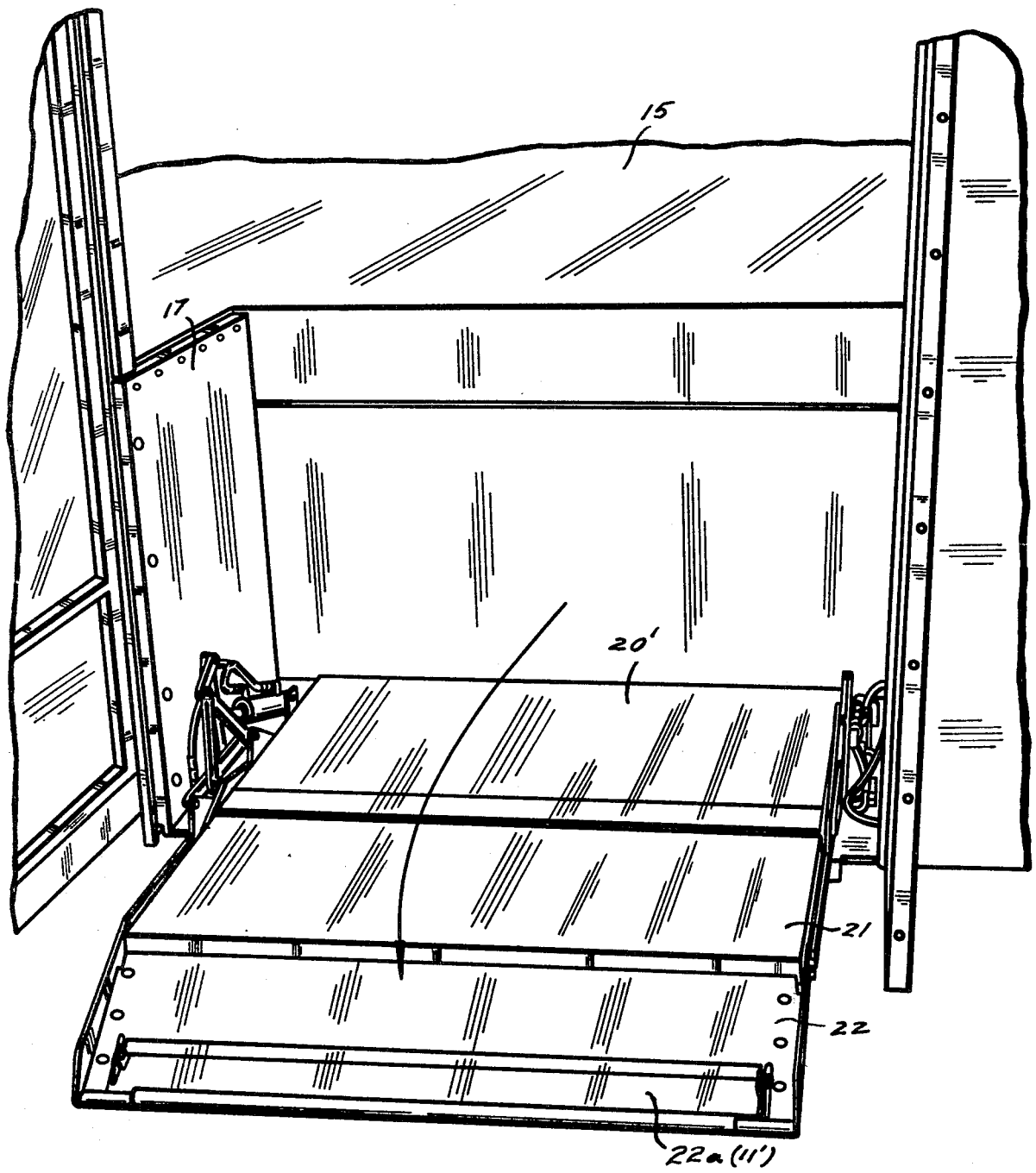
FIG. 19 is a perspective view of the improved automatic lift assembly illustrating the step and riser extended to form a loading platform which has been lowered to its ground level loading position with the riser in its lowered freely pivotal loading ramp position and with the safety guard barrier plate still in its retracted position against the riser.

As will be hereinafter described, a retractable upper step 21 having a riser 22 pivotally connected thereto is provided within the lift carriage 17. The upper step 21 and the riser 22 are movable with and are selectively extendable from the lift carriage 17 so as to form a loading platform extension 23 in combination with the base 20 of the carriage lift 17 as shown in FIGS. 3 and 4. More specifically, the platform 23 is formed by pivotally extending and lowering the upper step 21 so that it lies in an abutting co-planar relationship with the base 20 of the lift carriage 17. The riser 22 is freely pivotal so as to provide a loading ramp extension to compensate for uneven ground to complete the loading platform as shown in FIGS. 3 and 19. The loading platform 23 is shown in phantom line in FIG. 3 in its lowered ground level loading position with the riser 22 in its lowered loading ramp position so as to receive a wheelchair or permit an ambulatory person to walk directly onto the platform 23 formed by the base 20 and the upper step 21. This is also shown in the improved embodiment of the invention as shown in FIG. 19.

In the earlier embodiment of the invention as shown in FIG. 4, the lift carriage 17 and platform 23 associated therewith is shown in its lowered ground level loading position. The riser 22 is in its raised safety guard position which prevents a wheelchair (not shown) from rolling off of the platform while it is being raised or lowered. However, this decreases the effective size of the carrying platform.

Figure 20:
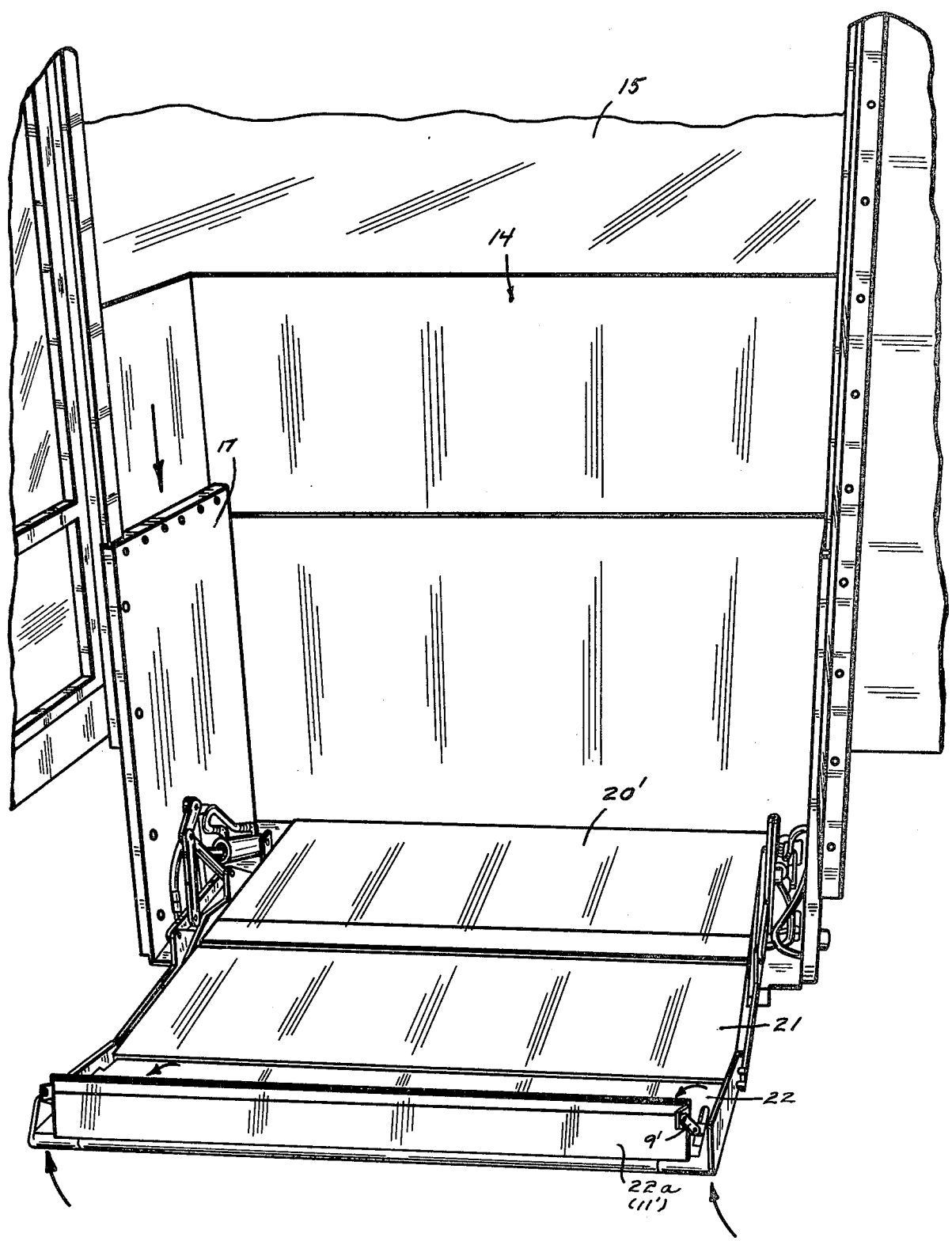
FIG. 20 is a perspective view of the improved automatic lift assembly as shown in FIG. 19 with the riser in its fixed horizontal position forming a co-planar extension of the loading platform and with the safety guard barrier plate in its raised vertically-oriented guard use position.
Figure 21:
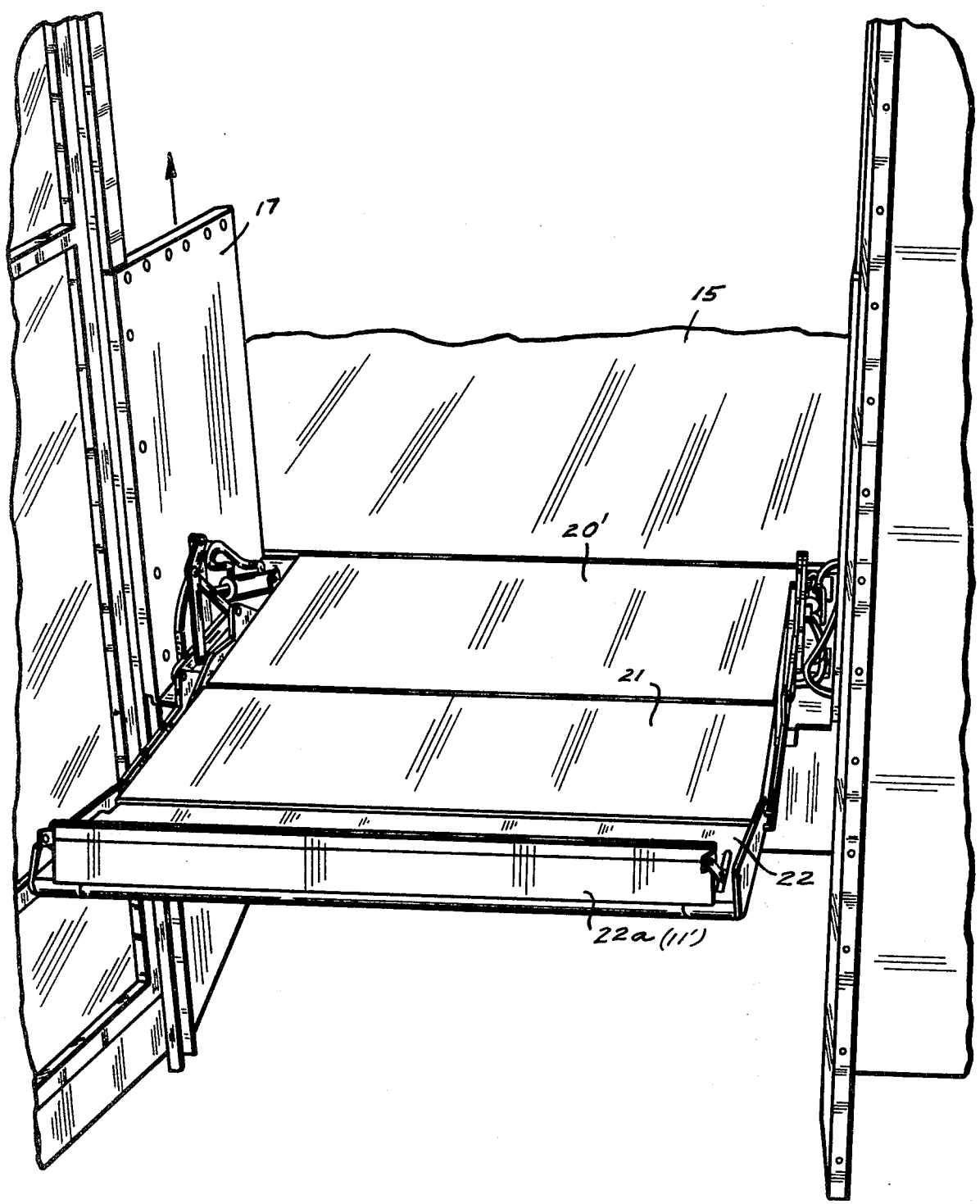
FIG. 21 is a perspective view of the improved automatic lift assembly with the lift carriage and enlarged loading platform in its raised unloading position level with the interior floor of the vehicle.
Figure 28:
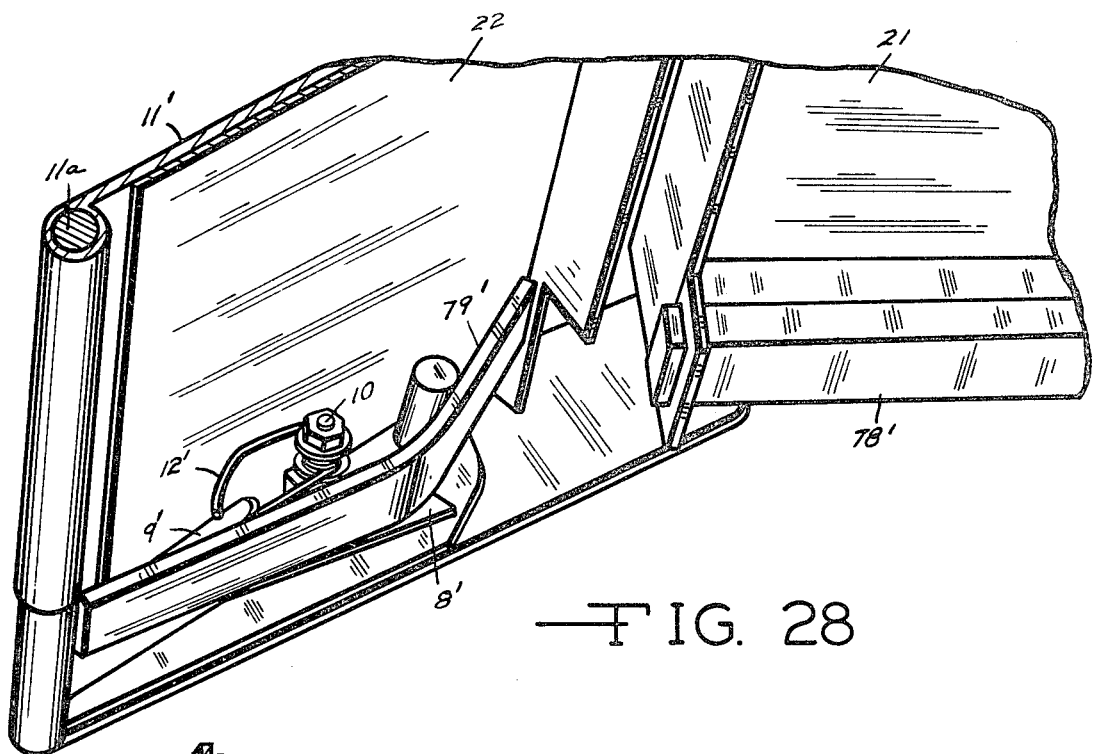
FIG. 28 is a partial schematic bottom view showing the safety guard barrier plate actuating mechanism in its retracted position.
Figure 29:
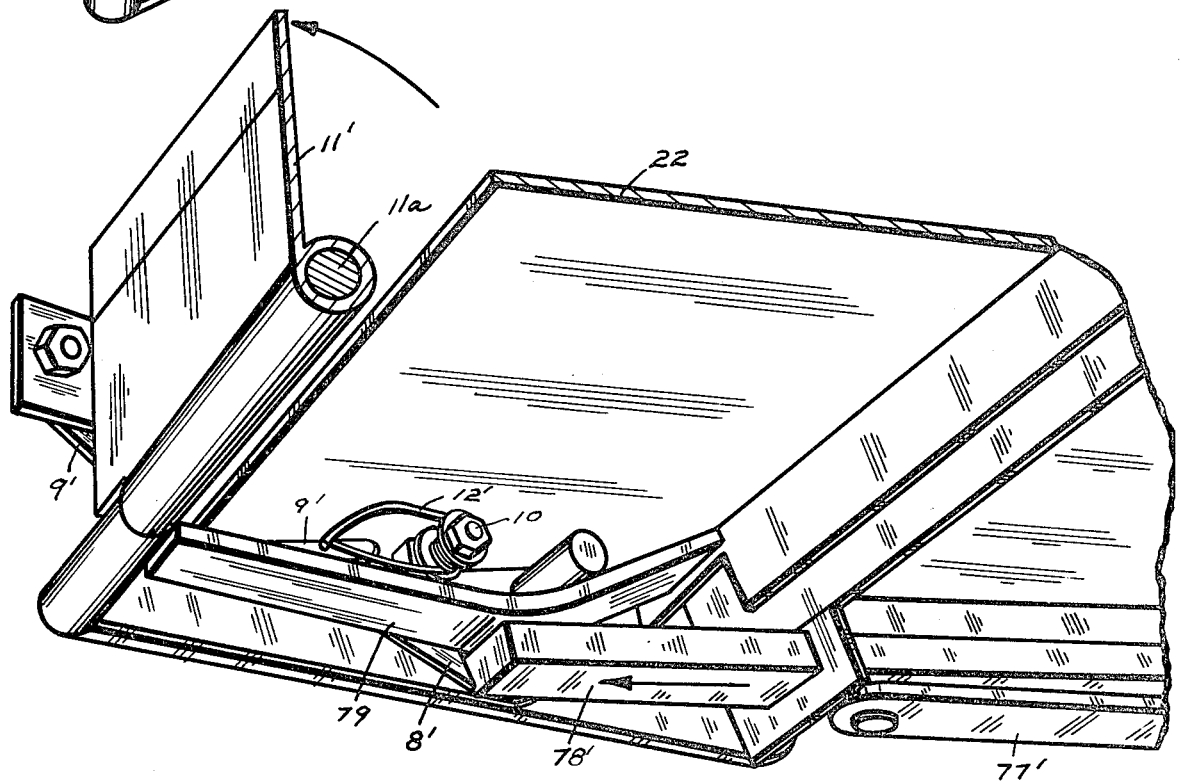
FIG. 29 is a partial schematic bottom view showing safety guard barrier plate actuating mechanism in its extended position with the safety guard barrier plate in its raised operative use position.
Figure 30:
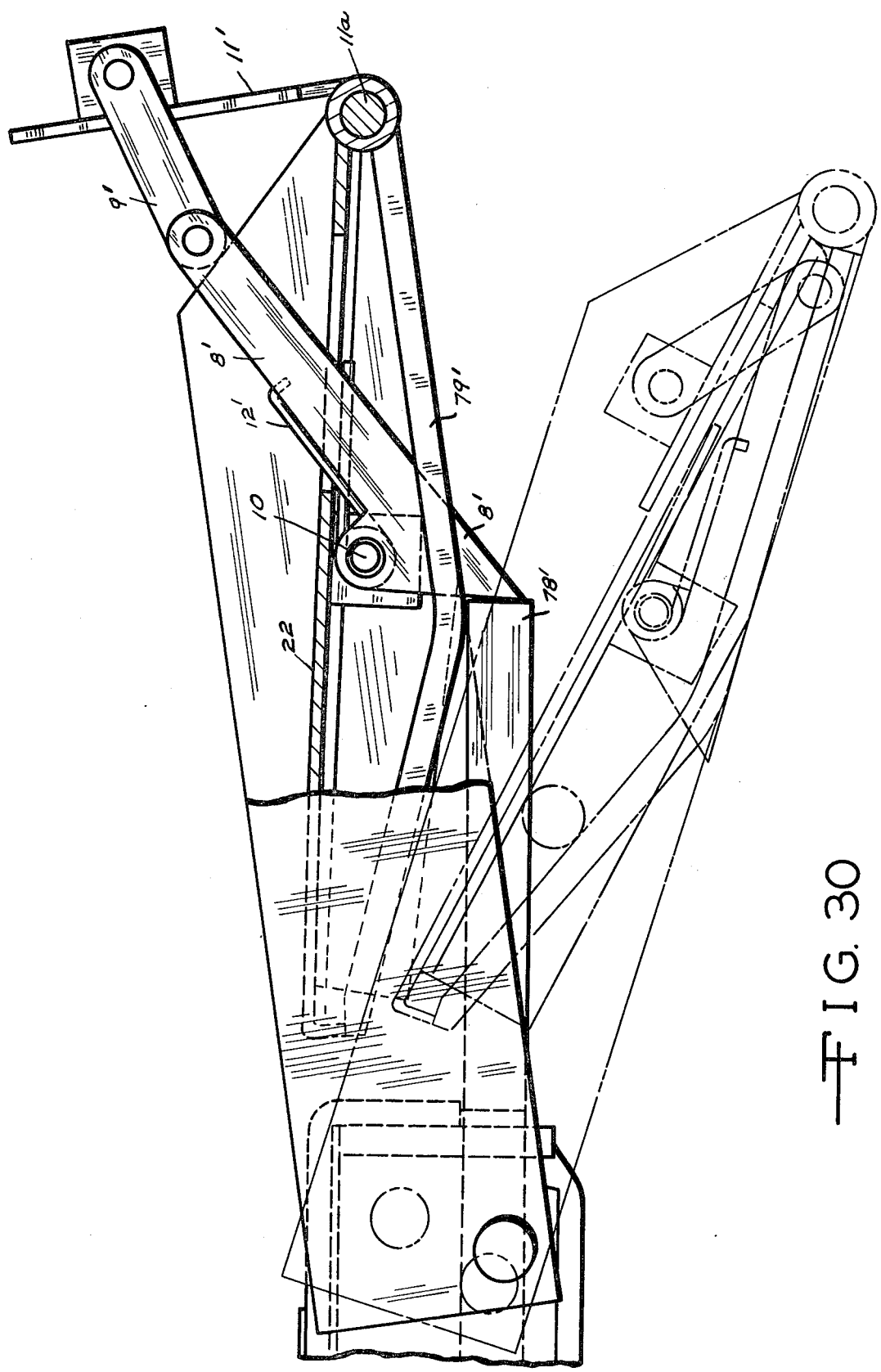
FIG. 30 is a schematic side elevation view showing the safety guard barrier plate control linkage with the barrier plate in its raised guard position and in phantom line in its retracted stored position.

In the improved embodiment of the invention as specifically shown in FIGS. 20, 21 and 29 the riser 22 is kept at its horizontal use position, thus increasing the capacity of the carrying platform throughout its lifting and lowering operation. A safety guard barrier plate 22a is provided along the outer longitudinal edge of riser 22. Barrier guard plate actuating means are provided to selectively raise the guard plate 22a to its vertical guard position as shown in FIGS. 20, 21 and 29 or pivot it to its stored rest position against the riser 22 as shown in FIGS. 18, 19 and 28.

Figure 5:
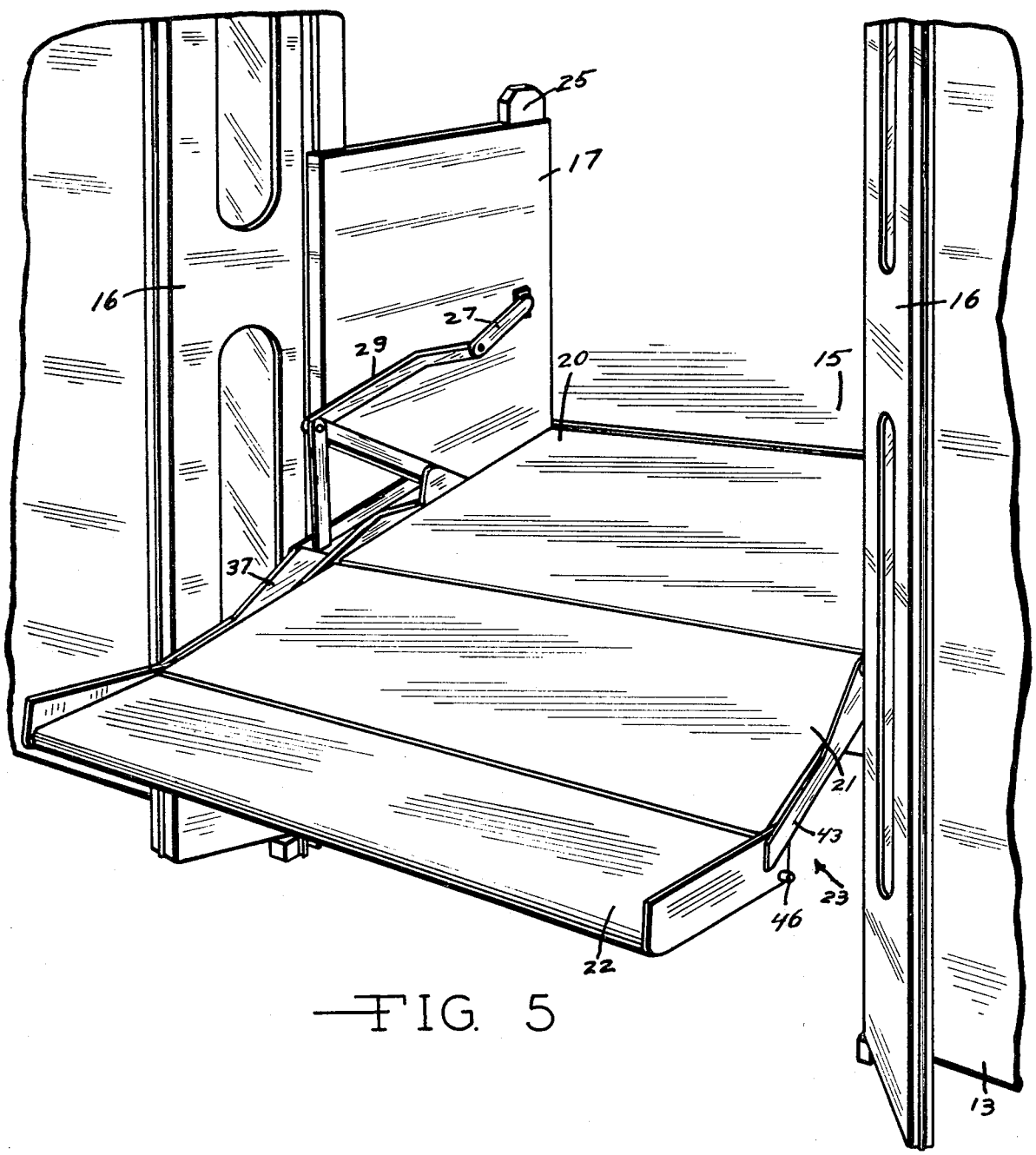
FIG. 5 is a perspective view of the automatic lift assembly with the lift carriage and loading platform in its raised unloading position level with the interior floor of the vehicle.

As shown in FIG. 5, the lift carriage 17 is raised so that the platform 23 is at the level of the interior floor of the vehicle so that the wheelchair or person thereon can be moved directly into the interior of the vehicle. This is also shown in FIG. 21 with respect to the improved embodiment of the invention described herein.

Figure 18:
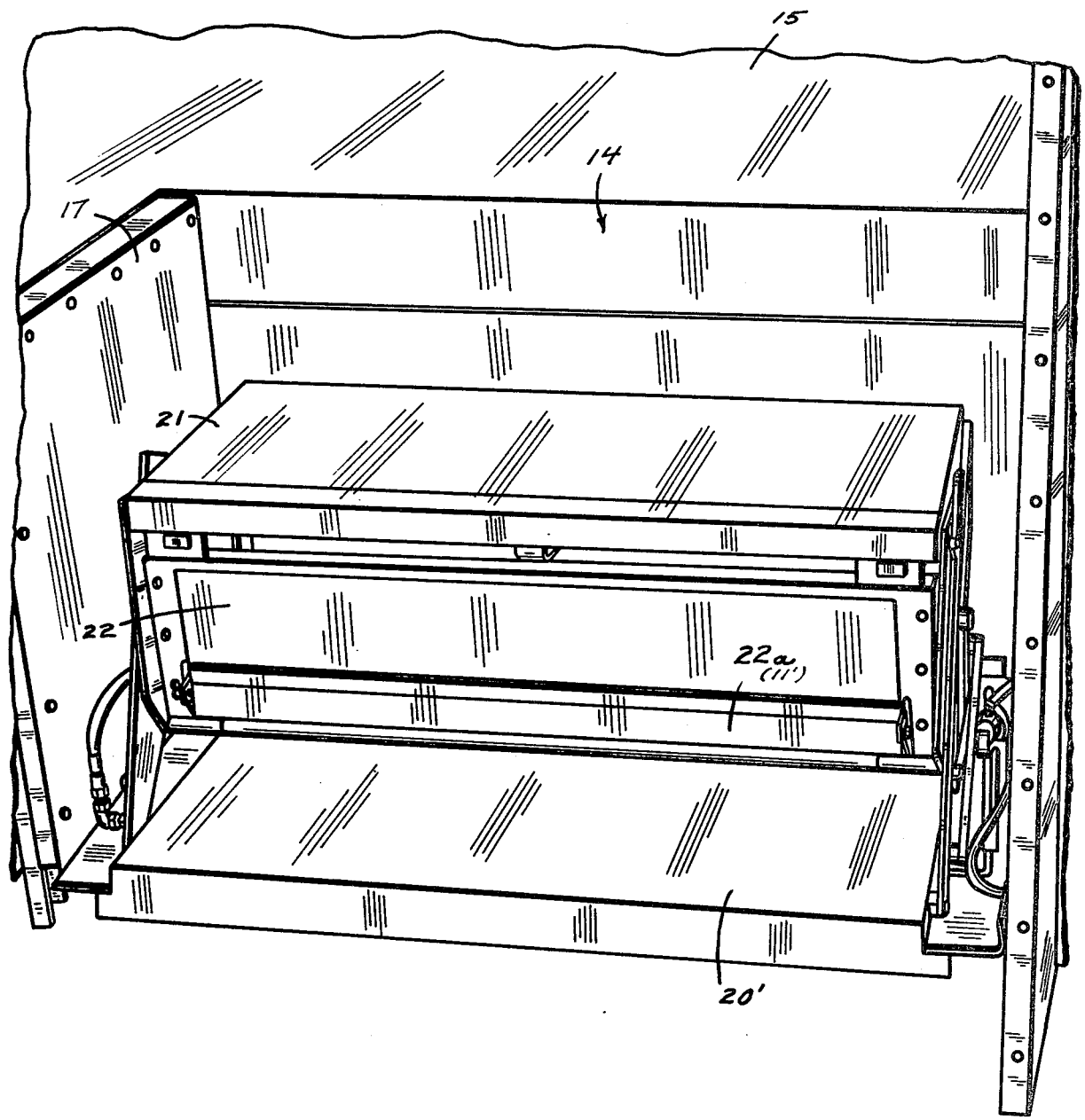
FIG. 18 is a perpective view of the improved automatic lift assembly in its use position in a vehicle door opening with the upper step and riser retracted into their normal step use position and showing the safety guard plate retracted against the lower portion of the riser.

It should be noted that lift carriage 17 with the retracted step 21 and riser 22 in their retracted normal use step position as shown in FIGS. 1 and 18 can be lowered to ground level so that a person can step thereon. The lift carriage can subsequently be raised to permit the user to step or walk into the interior of the vehicle as necessary.

In the automobile lift assembly shown in the earlier co-pending patent application, Ser. No. 855,288, the step actuating linkage means are shown in FIG. 6 (step and riser retracted) and in FIG. 7 (step and riser being extended). It is within the scope of the invention to add corresponding co-acting step actuating linkage means to the other side of the lift carriage. A step actuating control cylinder 24 is anchored at one end to an anchor block 25 provided at the top of one of the side panels of the lift carriage 17 and is movable therewith. The control cylinder actuator rod 26 is pivotally connected to an angular control level 27 which is pivotal about pivot pin 28 provided in the side wall of the lift carriage. The angular control level 27 is in turn pivotally connected to a first connector link 29 by pin 30. The first connector link 29 is in turn pivotally connected to the second connector link 32 by pin 31. The second connector link 32 is connected at its other end to the first pivotal extender arm 34 by pin 33. A third connector link 35 is pivotally connected at one end to pin 33 and at the other end to pin 36 provided on the second pivotal extender arm 37.

As shown in FIGS. 22, 23, 24 and 25, the improved automatic lift assembly utilizes a step actuating assembly which is self-contained and mounted solely in operative engagement with the upper step 21 and riser 22 elements and the bottom 20 of the lift carriage 17. The improved step actuating assembly provides more positive control of the movable step and riser as they are being selectively extended and retracted. The improved step actuating assembly further allows for critical pre-assembly and testing of the step and riser assembly before installation in lift carriage 17. Further, there is a cost savings over the earlier structure as shown in FIGS. 6 and 7 in that the anchor block 25, control lever 27, pivot 28, connector link 29 and second connector link 32 are eliminated. As shown in FIGS. 21 through 25, the improved step actuating assembly consists of a hydraulic cylinder 24' which is pivotally connected at one end to the base 20' at pivot 20a and at the other end to control link 3' at pivot 3d by cylinder rod swivel 2. The control link 3' is pivotally connected at one end to the base of the lift carriage (lower step) 20' by pivot pin 3a and at the other end to the connecting link 4' by pivot pin 3b. The connecting link 4' is pivotally connected to link 32" by pivot pin 3c. It should be noted that links 32', 32" and 35 are rigidly connected (welded) together and cannot articulate within that assembly. Further, it should be noted the improved step actuating assembly (including cylinder 24') is provided on each side of the step assembly so as to balance the forces required to extend and retract the upper step and riser assembly. The remainder of the improved step actuating assembly is the same as that shown in FIGS. 6 and 7 and the operation thereof is hereinafter described.

The first pivotal extender arm 34 is pivotally connected at one end thereof to the upper step 21 by pin 38 and at the other end thereof is fixedly connected to rod 39 which is provided through the base of the carriage lift. Rod 39 extends through the base of the carriage lift to fixedly engage a corresponding extender arm 40 positioned on the opposite side of the carriage lift 17. The extender arm 40 is similarly connected to the opposite end of the upper step 21. The second pivotal extender arm 37 is pivotally connected at one end thereof to the upper step 21 by pin 41 and at the other end thereof is fixedly connected to rod 42 which is provided through the base of the carriage lift. Rod 42 which is spaced apart from the parallel to rod 39, also extends through the base of the carriage lift to fixedly engage a corresponding extender arm 43 positioned on the opposite side of the carriage lift. The extender arm 43 is similarly connected to the opposite end of upper step 21.

The riser 22 is pivotally connected to upper step 21 at points 44 at each end of upper step 21. Cam pins 45 and 46, respectively, extend outwardly from each end of the riser 22. As shown in FIGS. 6 and 22, the cam pin 45 engages a cam extension 47 provided on the second extender arm 37 so as to retain the riser in its retracted vertical position. A similar cam extension (not shown) is provided on the corresponding extender arm 43 so as to engage cam pin 46.

As shown in phantom line in FIGS. 7, 22, 23, 24 and 25, when the extender arm 37 is pivoted outwardly, the end thereof moves into contact with cam pin 45 so as to pivotally move the riser into a slightly below horizontal loading ramp position. The same action occurs on the opposite end of the riser when the end of the extender arm 43 engages cam pin 46.

In operation, the step actuating linkage means can be selectively actuated to pivotally extend the upper step 21 and riser 22 outwardly and downwardly so as to form a co-planar platform extension 23 of the lower step or base 20 of the carriage lift 17 as shown in FIG. 3. In the earlier embodiment of the invention, as shown in FIG. 7, this is accomplished by activation of actuating cylinder 24 to selectively retract piston rod 26. The piston rod 26 acts upon the angular control lever 27 so as to pivot the angular control lever 27 about pivot pin 28. Thus pivoted, the angular control lever 27 acts upon the connector links 29 and 32 so as to pivotally move the first and second extender arms 34 and 37, respectively, about the pivot points established by rods 39 and 42. In the improved embodiment of the invention, as shown in FIGS. 22 through 25, the actuating cylinder 24' acts directly upon the connecting link 3' to actuate the step mounted actuating assembly previously described. The extender arms 34 and 37 move simultaneously because they are connected by connector link 35. The corresponding oppositely positioned extender arms 40 and 43 move simultaneously because they are fixedly connected to rods 39 and 42, respectively. Thus the pivotal movement of the extender arms 34, 40 and 37, 43 moves the upper step 21 outwardly and downwardly while maintaining its horizontally-oriented position. As extender arms 37 are pivoted toward their substantially horizontal extended position, they contact cam pins 45 and 46, respectively, so as to pivotally raise the riser 22 to its loading ramp position as shown in FIGS. 2 and 25. In actuality, the riser 22 is only pivoted to a position which is approximately 30 degrees below horizontal. The riser 22 is free to pivot upwardly toward a horizontal position as required upon contact with the ground or curb so as to provide a ramp for rolling a load upon the platform 23.

The lift carriage actuating means 48 are shown in FIGS. 8 through 10 and 26. The lift carriage assembly is selectively raised or lowered by applying hydraulic pressure to a power unit 49 which consists of a double-acting hydraulic piston whose linear travel is converted to rotary output through interference meshed teeth on the piston and on the output shaft. In the earlier embodiment of the invention, the rotary output shaft 50 is adjustably connected to the main pivot actuator shaft 51 by use of adjustment connector means 52 (see FIG. 9). The adjustment connector means 52 comprises an elbow connector arm 53 which is fixedly connected to the main pivot actuator shaft 51 and which is adapted to engage a collar pin extension 54 provided on the rotary output shaft 50. The improved adjustment connector means (not shown) consists of a device known commercially as an air brake slack adjuster replacing elbow connector 53, and is fixedly connected to the main pivot actuator shaft 51. The collar pin extension 54 is replaced by a lever commercially known as a pitman arm and is fixedly connected to the rotary output shaft 50. A sleeve connector whose interior diameters are such as to slidably engage the rotary output shaft 50 and the main pivot actuator shaft 51 is used to maintain shaft centerlines in alignment. A spacer lever is welded to the sleeve connector to fill the void between the pitman arm and the slack adjuster and the three parts are bolted together at some distance from their respective pivotal center mountings. The improved adjustment connector means provides a greater adjustment range to insure the lift carriage platform height when raised to be equal to the vehicle floor height. Further, there is a cost savings in manufacturing in that precise fixturing of the main actuator pivot shaft 51 and the lift carriage pivot support arms 56 and 57 and indexing of the elbow connector 53 is eliminated. The main pivot actuator shaft 51 extends parallel to and behind the rear wall 55 of the well recess in which the lift carriage 17 is mounted. A pair of spaced-apart lift carriage pivot support arms 56 and 57, respectively, are fixedly attached to the actuator shaft 51 and are configured to extend into the recess well parallel to and spaced apart from the exterior surfaces 58 and 59, respectively, of the side walls of the lift carriage 17.

Figure 8:
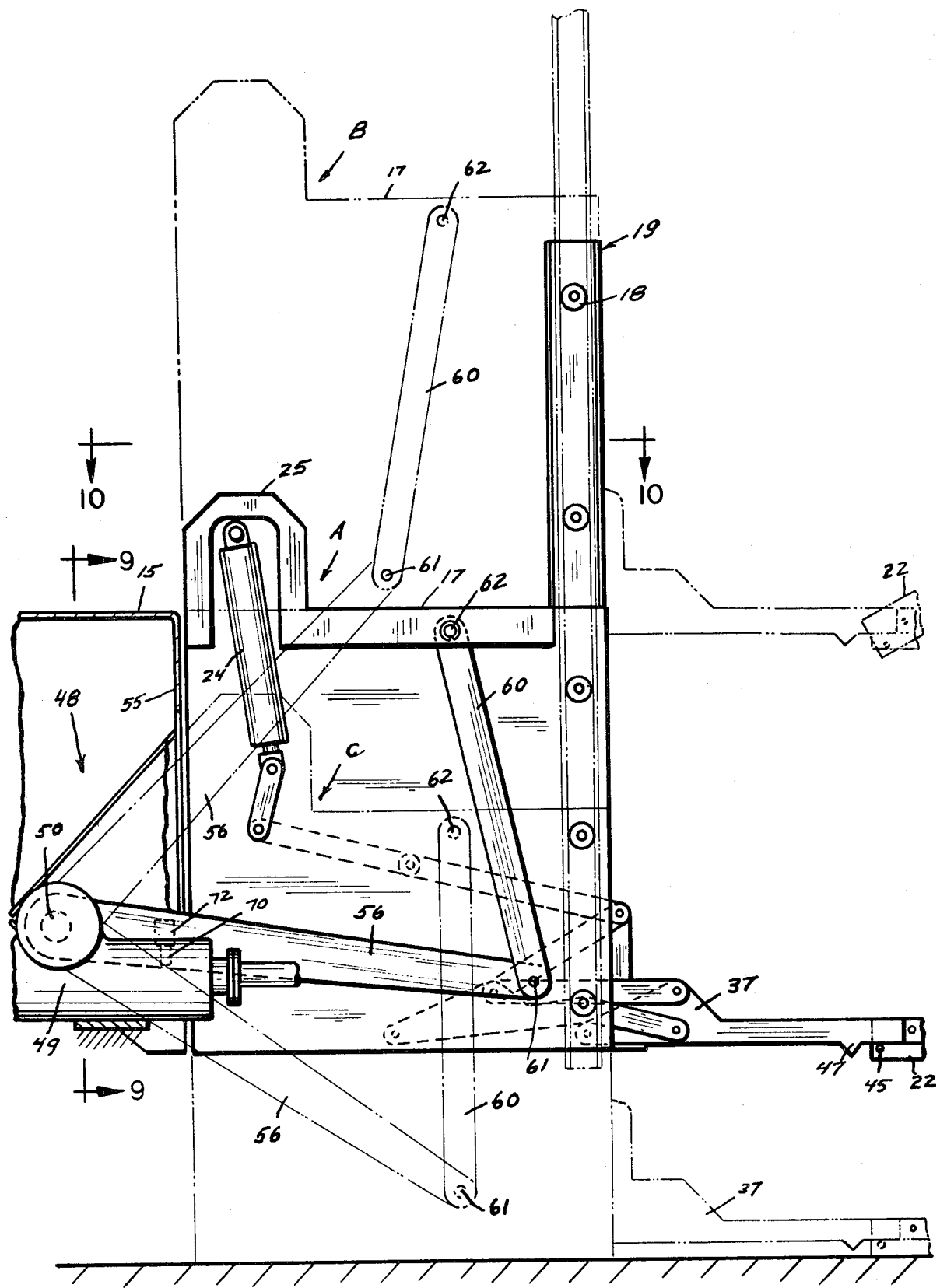
FIG. 8 is a schematic side elevation view of the automatic lift assembly illustrating the lift carriage actuating means and showing the lift carriage in its lowered ground level position, in its intermediate normal step position and in its raised vehicle floor level position.
Figure 26:
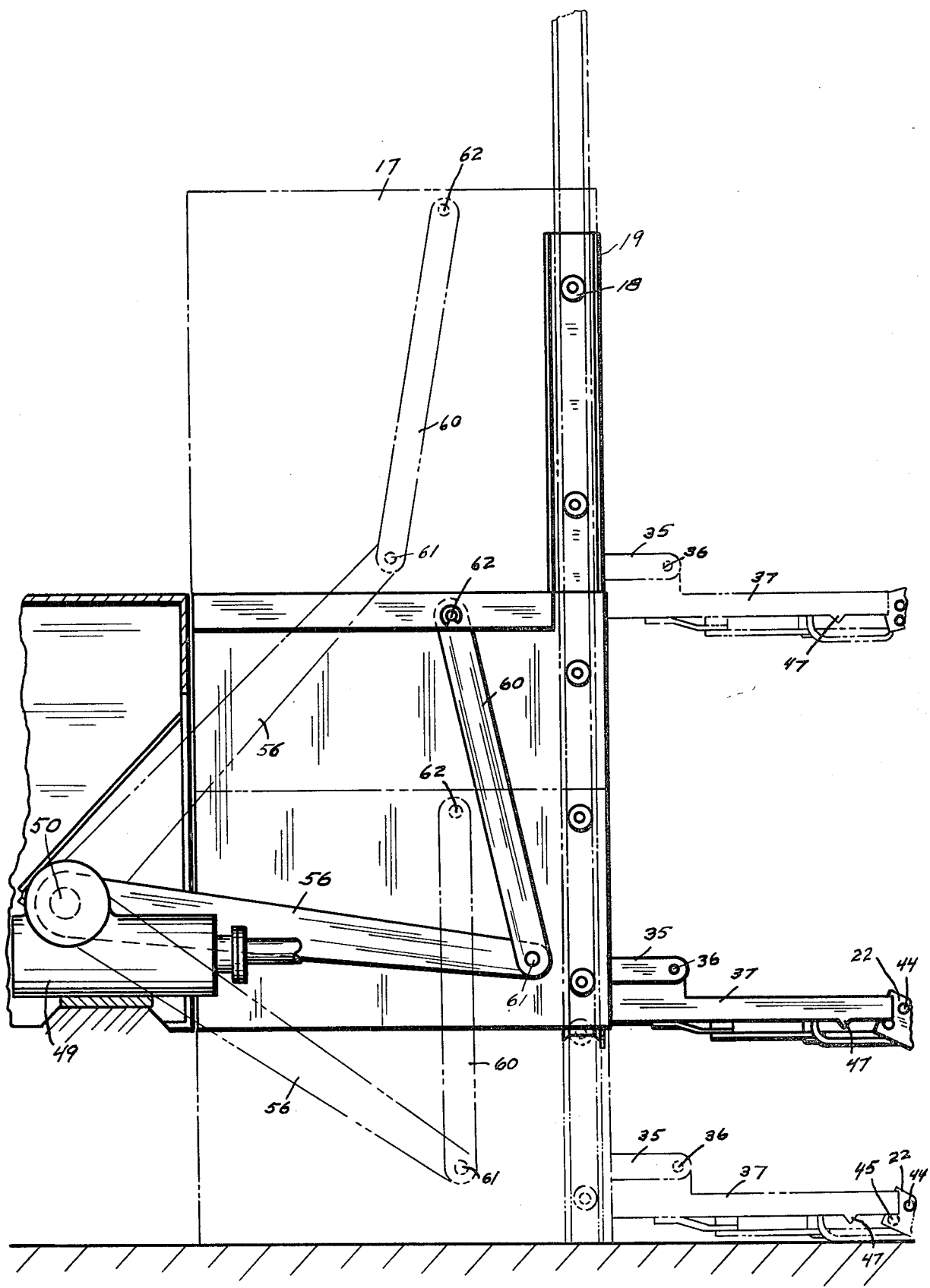
FIG. 26 is a schematic side elevation view of the improved automatic lift assembly illustrating the lift carriage actuating means and showing the lift carriage in its lowered ground level position, in its intermediate normal step position and in its raised vehicle floor level position.
Figure 27:
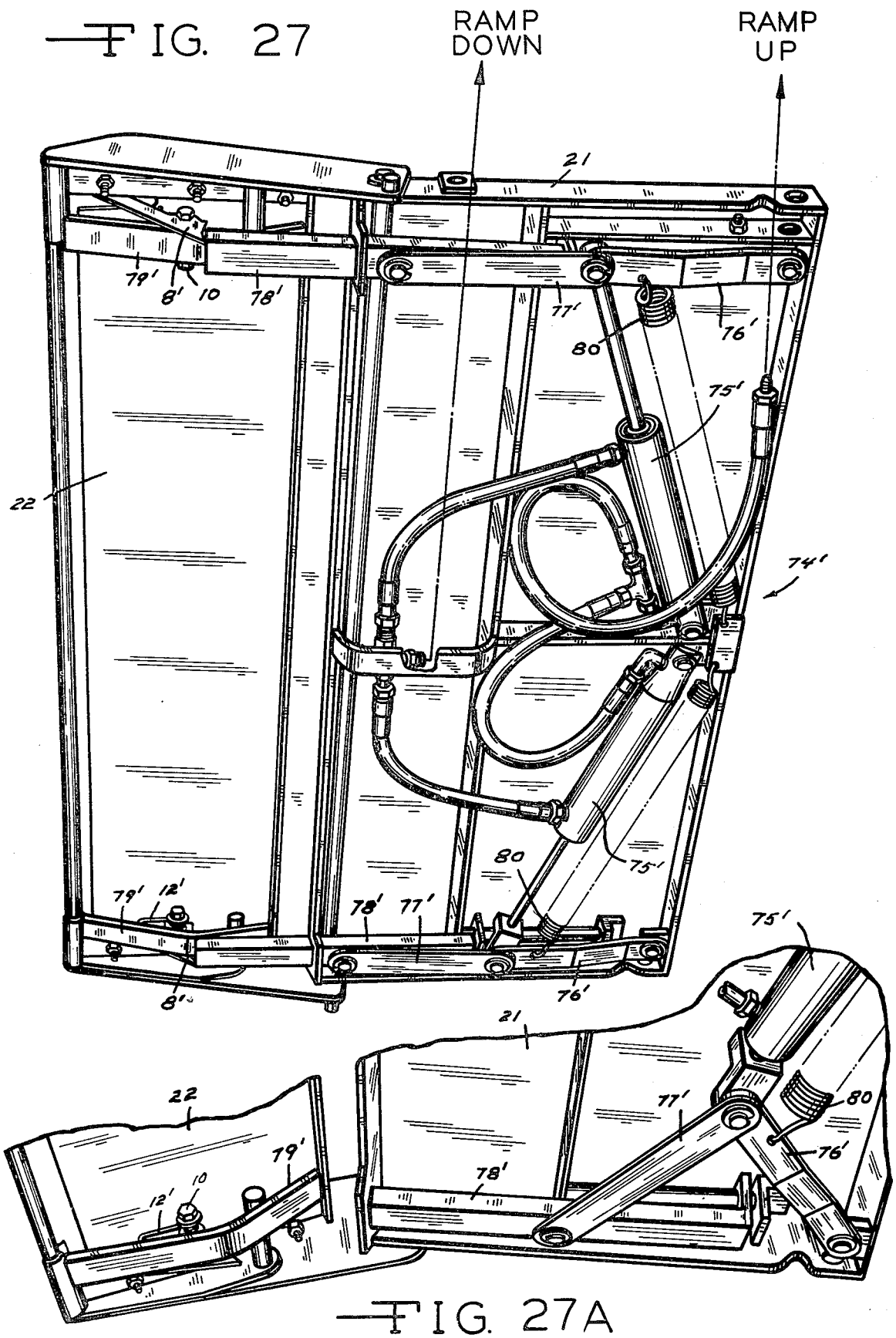
FIG. 27 is a schematic bottom perspective view of the riser (ramp) actuating assembly in engagement to move the riser (ramp) into its fixed horizontal position as a co-planar extension of the loading platform.

Each of the lift carriage pivot arms 56 and 57, respectively, are pivotally connected to one end of the connector links 60 by pivot pins 61. Each connector link 60 is pivotally anchored to the respective sides of the lift carriage by anchor pin 62. As shown in FIGS. 8 and 26, the pivot arms 56 and 57 in conjunction with their respective connector links 60 support the lift carriage 17 in its normal use position A with the recess well. Upon selective actuation of the power unit 49, the main pivot actuator shaft 51 is rotated to pivotally raise the pivot arms 56 and 57 extending therefrom. This movement raises the connector links 60 with the resultant lifting of the lift carriage 17 to the raised position B as shown in phantom line in FIGS. 8 and 26. In this position the base 20 of the lift carriage is even with the interior floor 15 of the vehicle.

Upon selective rotation of the main pivot actuator shaft 51 in the opposite direction, the pivot arms 56 and 57 and connector links 60 are lowered so as to move the lift carriage 17 to its ground or curb level lowered position C as further shown in phantom line in FIGS. 8 and 26. Although in FIGS. 8 and 26 the lift carriage 17 is shown with the upper step 21 and riser 22 in their extended platform 23 position, it is possible for the lift carriage 17 to be moved to the raised B and lowered C positions with the upper step 21 and riser 22 remaining in their normal retracted stowed step position as shown in FIGS. 1 and 18, respectively.

Figure 10:
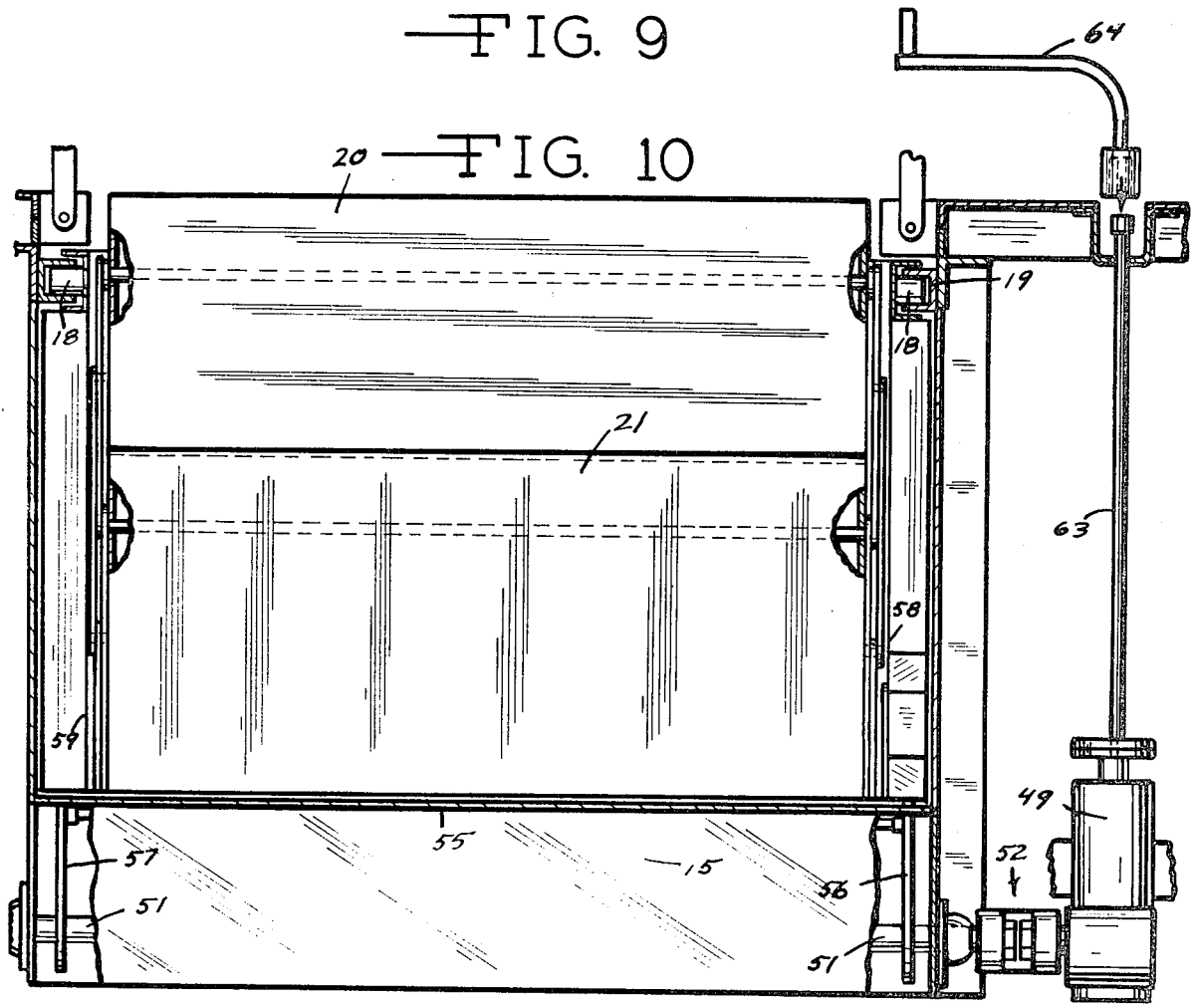
FIG. 10 is a schematic cross-sectional top view of the automatic lift assembly taken on line 10—10 of FIG. 8 showing the lift carriage and the lift carriage actuating means associated therewith.

As shown in FIG. 10, the power unit 49 is provided with a manual control shaft 63 and detachable handle 64 so that the lift carriage 17 can be manually raised, lowered and/or returned to its normal intermediate position B in event of failure of the regular hydraulic control system.

It is within the scope of the improved structure that a manual hand pump be provided that will perform all functions of the lift in event of an electrical failure. The unit will require a six-way manual control valve to direct the oil to the proper circuits from the pump.

Figure 9:
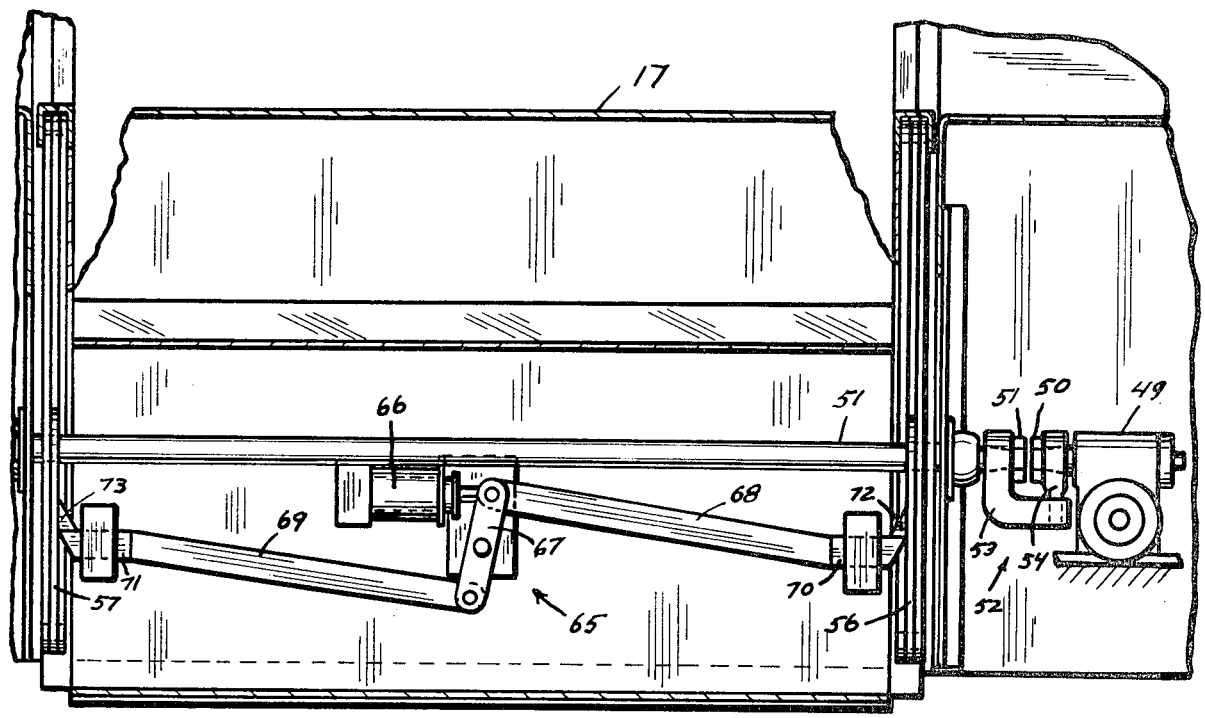
FIG. 9 is a schematic cross-sectional rear elevation view of the automatic lift assembly taken on line 9—9 of FIG. 8 showing the lift carriage safety lock assembly in engagement with the pivot arms of the lift carriage actuating means.

As shown in FIG. 9 (and as continued in the improved automatic lift assembly), a selectively actuated safety stop assembly 65 is provided to support the lift carriage 17 in its normal step height position B within the recess well. A solenoid actuator cylinder 66 is provided in engagement with a pivotal control link 67 which is connected to actuator connector links 68 and 69 at each end thereof. The actuator connector links 68 and 69 are provided with safety slide blocks 70 and 71, respectively, which are adapted to supportably engage fixed support blocks 72 and 73 provided on the pivot arms 56 and 57, respectively, while the lift carriage 17 is in its normal step height position B. Prior to lowering the lift carriage 17 to its lowered position C, the actuator cylinder 66 is actuated so as to retract the slide blocks 70 and 71 out of contact with fixed support blocks 72 and 73, respectively. This permits the pivot arms 56 and 57 to be lowered as desired. In practice, the pivot arms 56 and 57, and hence the lift carriage 17, are raised slightly so as to release the load on the safety slide blocks 70 and 71, thus permitting the cylinder 66 to easily retract them. This feature tests the integrity of both the electrical and hydraulic systems before allowing the lift to be deployed.

The safety slide blocks 70 and 71 are spring biased to return to their normal support interference position in alignment with the fixed support blocks 72 and 73 after the lift carriage 17 has been lowered.

After the pivot arms 56 and 57 are lowered, the spring biased slide blocks 70 and 71 move outwardly back into their normal support position. Both the fixed support blocks 72 and 73 and their respective slide blocks 70 and 71 are correspondingly tapered so that the fixed support blocks 72 and 73 easily displace and move past the safety slide blocks 70 and 71 as the pivot arms 56 and 57 pivot upwardly to move the lift carriage 17 into its raised position B as shown in FIG. 8.

Thereafter, when the pivot arms 56 and 57 move downwardly to return the lift carriage 17 to its normal rest position A, the fixed support blocks 72 and 73 come to rest upon the slide blocks 70 and 71 so as to support the lift carriage 17 in position A. This is shown in FIG. 9 and in phantom line in FIG. 8. It is within the scope of the invention to provide for selective mechanical, rather than solenoid, actuated retraction of the slide blocks 70 and 71. In addition, in another embodiment of the invention the linkage controlled slide blocks are provided on the pivot arms 56 and 57 and the fixed support blocks are correspondingly mounted on the side walls of the recess well (not shown). This mechanical stop feature which is also incorporated into the improved embodiment of the invention insures that there would be no "hydraulic drift" of the lift downward, thus preventing damage to the lift or suddenly actuating the vehicle brakes because an interlock switch detected the lift out of position.

Figure 11:
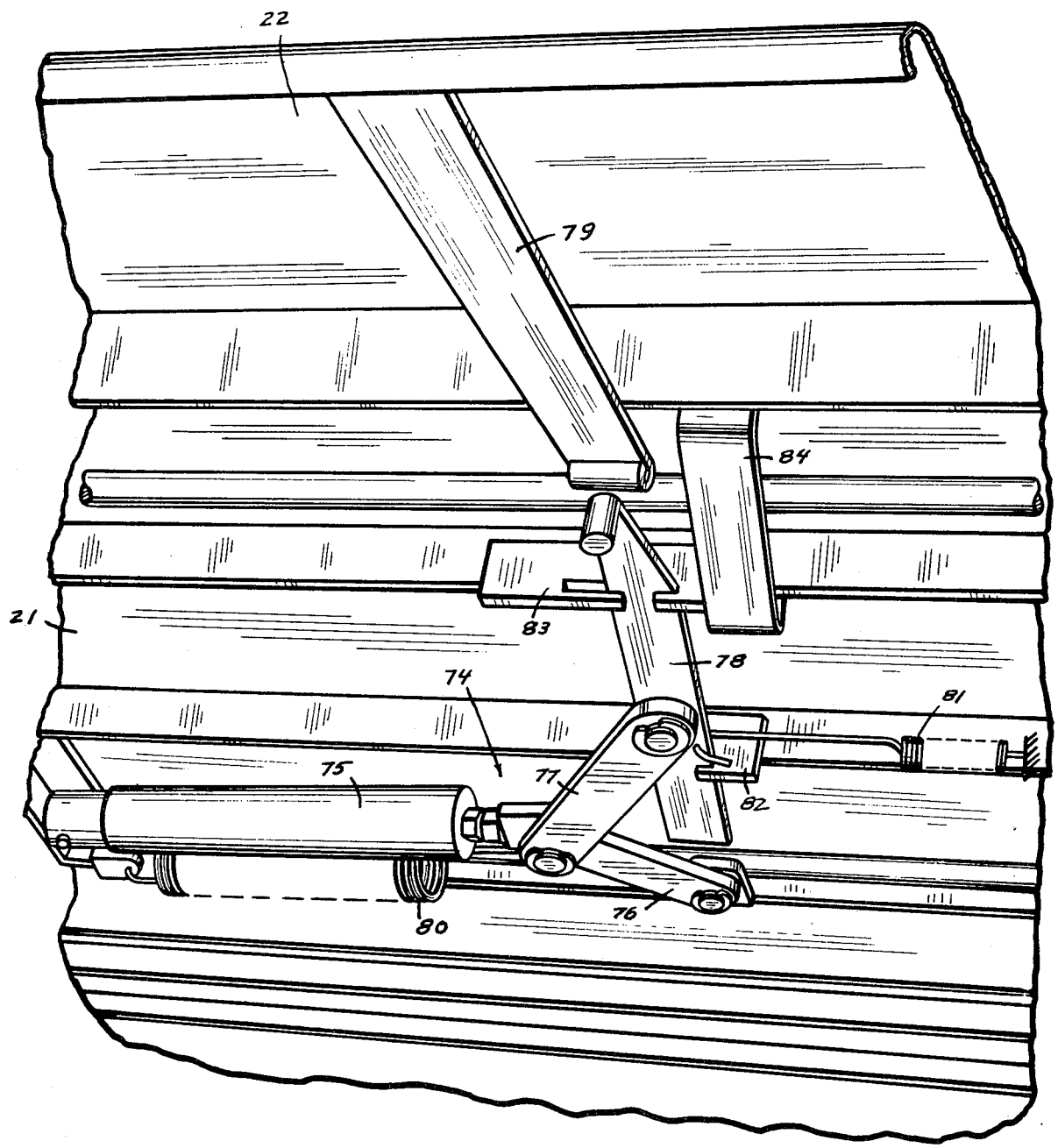
FIG. 11 is a schematic bottom perspective view of the extended loading platform showing the riser safety guard actuating assembly in its normally rest position.
Figure 12:
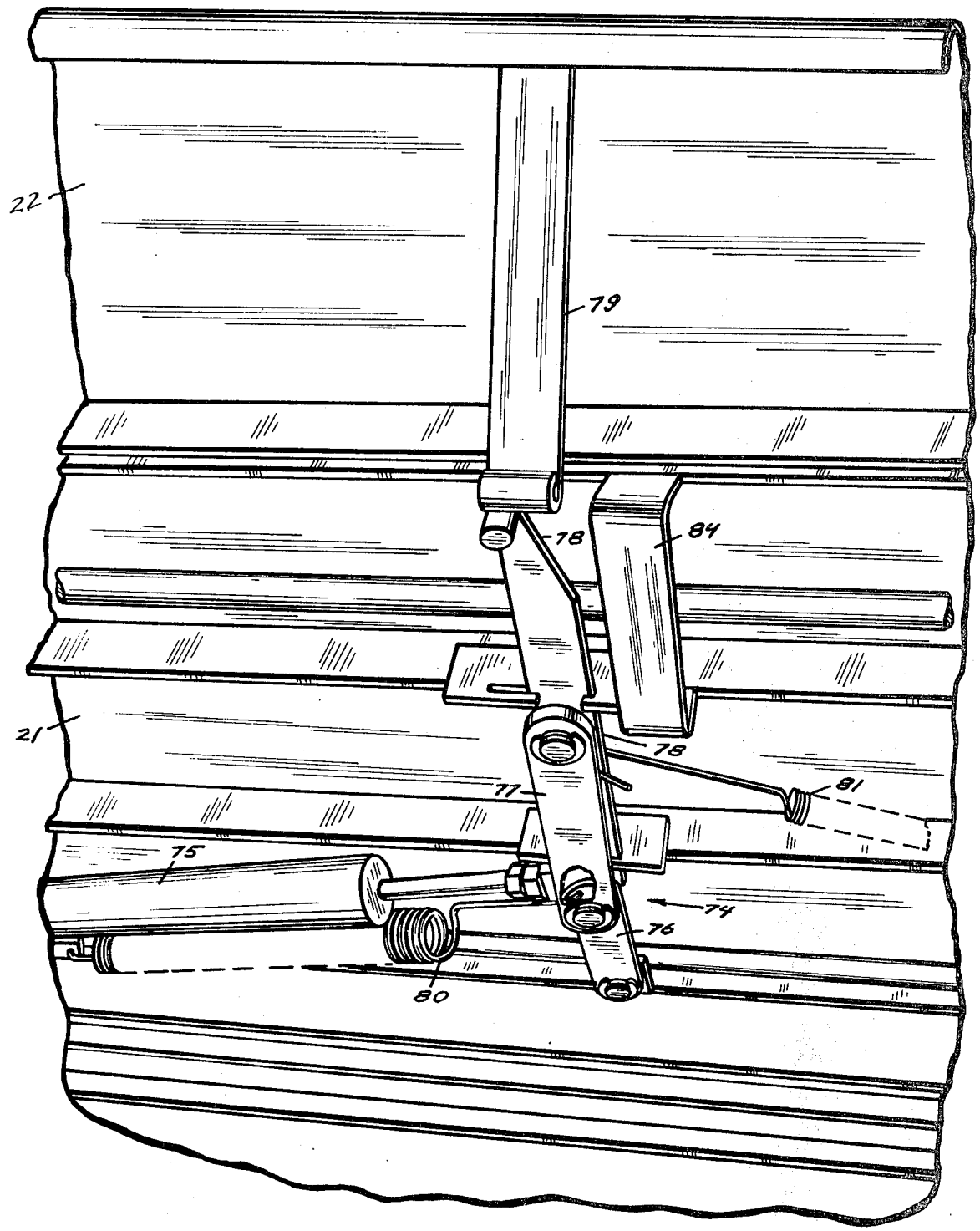
FIG. 12 is a schematic bottom perspective view of the extended loading platform showing the riser safety guard actuating assembly in engagement to move the riser to its raised safety guard position.

In the earlier embodiment of the invention, as shown in FIGS. 11 and 12, a riser safety guard actuating assembly 74 is provided so as to selectively raise the riser 22 to a raised safety stop position of about 30 to 35 degrees above the horizontal as shown in FIGS. 4, 5, 8 and 12. In this raised position, the riser 22 prevents a wheelchair or the like from rolling off of the lift carriage 17 onto the ground. The riser safety guard actuating assembly 74 consists of a hydraulic actuating cylinder 75 which acts upon pivotally connected actuating links 76 and 77. The actuating links 76 and 77 in turn act upon a slidable push rod 78 which selectively slides under the fixed lift rod 79 provided on the riser 22 so as to pivotally raise the riser 22 to its raised inclined safety stop position. The pivotal links 76 and 77 are biased by spring 80 so as to retract the slidable push rod 76 when the actuating cylinder 75 is not exerting pressure against the links 76 and 77. A spring 81 retains the slidable push rod 78 within its guide supports 82 and 83. The guide supports 82 and 83 are slotted so as to permit side clearance movement of the push rod 78 if the riser encounters an obstacle and the fixed push rod 79 cannot move in response to pressure from the actuating cylinder 75. As shown in FIGS. 11 and 12, the actuating cylinder 75, the pivotal links 76 and 77, the slidable push rod 78, the guide supports 82 and 83 and springs 80 are positioned beneath the upper step 21 and are movable therewith. The fixed lift rod 79 is positioned on the underside of the riser 22 in direct alignment with the slide push rod 78. A ground rest member 84 is provided on the bottom side of the upper step 21 as shown in FIGS. 11 and 12.

In the improved embodiment of the automatic lift invention as shown in FIGS. 27 through 30, a riser and safety guard barrier plate actuating assembly 74' is provided so as to selectively raise the riser 22 from its free ramp position to a raised substantially horizontal position to form the outer co-planar extension of the loading platform. The improved riser and safety guard barrier plate actuating assembly consists of a pair of opposed hydraulic actuating cylinders 75' which act upon a pair of spaced-apart opposed actuating links 76' and 77'. Each pair of actuating links 76' and 77' in turn act upon slidable push rods 78' which selectively slide under fixed lift rods 79' provided on the riser 22 so as to pivotally raise the riser 22 to its raised horizontal position to form an extension of the loading platform in cooperation with the upper and lower steps. The pivotal links 76' and 77' are biased by springs 80 so as to retract the slidable push rods 78' when the actuating cylinders 75' is retracted and not exerting pressure on the links 76' and 77', as shown in FIG. 27A.

The safety guard barrier plate actuating assembly is shown in FIGS. 27, 27A, 28, 29 and 30. At the extreme outward stroke of the push bars 78', the push bars 78' contact each of their respective safety guard barrier plate actuating links 8' which is pivotally connected to its respective lift rod 79' at pivot 10. In response to such contact, each barrier plate actuating link 8' pivots about pivot 10 to actuate connecting link 9' which is pivotally connected at one end to the actuating link 8' and at the other end to the barrier plate 11' so as to raise the barrier plate 11' to its raised vertical guard position, as shown in FIG. 29. The barrier plate 11' is pivotally connected to the riser (ramp) 22 along the outer longitudinal edge thereof at pivot 11a. A spring 12' retracts links 8' and 9' when the push bar 78' is retracted and is not exerting pressure on link 8', thus storing the barrier plate 11' in its stored position against the riser (ramp) 22 as shown specifically in FIG. 28.

It should be noted that the improved automatic lift assembly is provided with duplicate spaced-apart riser (ramp) and safety guard barrier plate actuating assemblies which are positioned proximate to each end of the barrier plate and riser and equidistant from the centerline of the upper step 21.

The improved riser and safety guard barrier plate actuating assembly is an improvement over the earlier apparatus described and claimed in the copending application, Ser. No. 855,288 (FIGS. 1–17) in that when the riser 22 is activated from its downward ramp position it becomes a co-planar horizontal extension of the lower step 20 and the upper step 21, thus extending the useful length of the resulting lift platform to better accommodate a wider variety of devices for the handicapped. The riser 22 is no longer inclined upwardly to perform a safety guard function, but remains in its horizontal position so as to increase the capacity of the carrying platform while the lift carriage is being raised and lowered. The safety guard barrier plate 11', located along the outer longitudinal edge of the riser 22, is activated automatically to its raised vertical safety guard position when the riser is moved to its horizontal position and acts to prevent the wheeled equipment from rolling off the carrier platform. The safety guard barrier plate actuating linkage is so designed that when the barrier plate is in its vertical use position, the restricting linkage is in tension and pivot centerline alignment, and therefore not subject to undesired over-travel or compression collapse of components.

A movable step shield panel assembly is provided in association with the lift carriage 17 so as to provide an enclosed continuation of the recess well when the lift carriage is moved to its lowered ground position C as shown in FIG. 4. The step shield panel 85 moves with the lift carriage 17 and acts as a safety shield to protect the legs of a person riding on the lift carriage from contact with the vehicle body and associated actuating structures positioned behind the safety shield panel 85. As shown in FIG. 16, one embodiment of the step shield panel assembly consists of a vertically-oriented panel 85 which extends across the rear open portion of the U-shaped lift carriage 17. An elongate horizontal flange 86 is provided along the lower edge of the step shield panel 85. Guide members 87 are provided on the rear surface of the step shield 85 which slidably engage channels 88 provided along the rear wall of the recess well. Retaining springs 89 engage the rear portion of the flange 86 so as to retain the shield in its normally up stowed position. As the U-shaped lift carriage 17 is moved to its lowered ground position C, the lower portion of the lift carriage 17 moves against the flange 86 to draw the shield panel 85 downwardly therewith. As the lift carriage 17 moves upwardly, the action of the spring 89 returns the step shield panel 85 to its stowed position with the rear portion of the flange 86 drawn against the lower edge of the rear wall of the recess well. It is within the scope of the invention to use alternate means of enabling the step shield panel to co-act with the lift carriage in the foregoing manner. The foregoing step shield panel assembly is incorporated into the improved lift assembly described herein.

Figure 31:
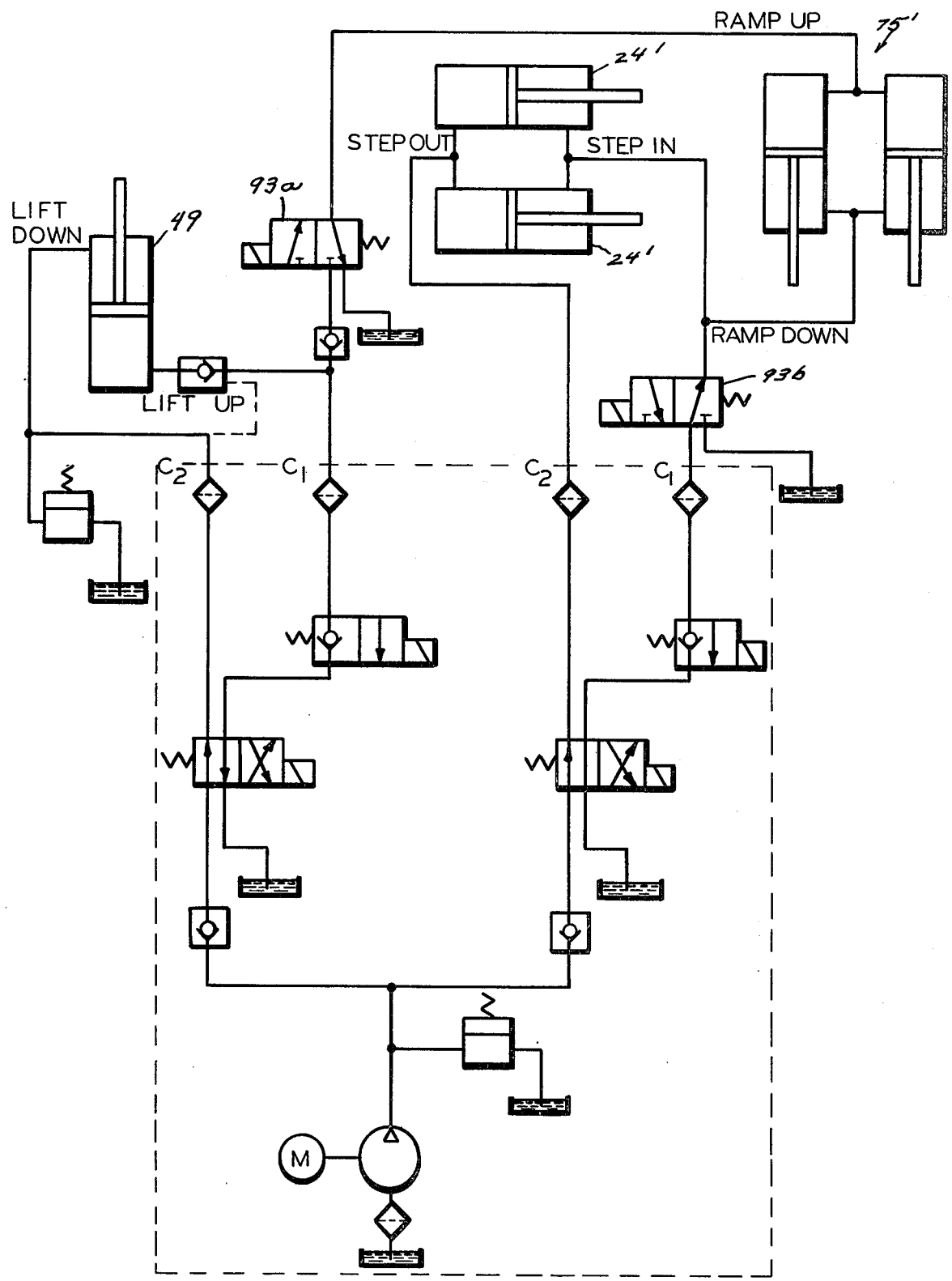
FIG. 31 is a schematic flow diagram showing the hydraulic control system.
Figure 32:
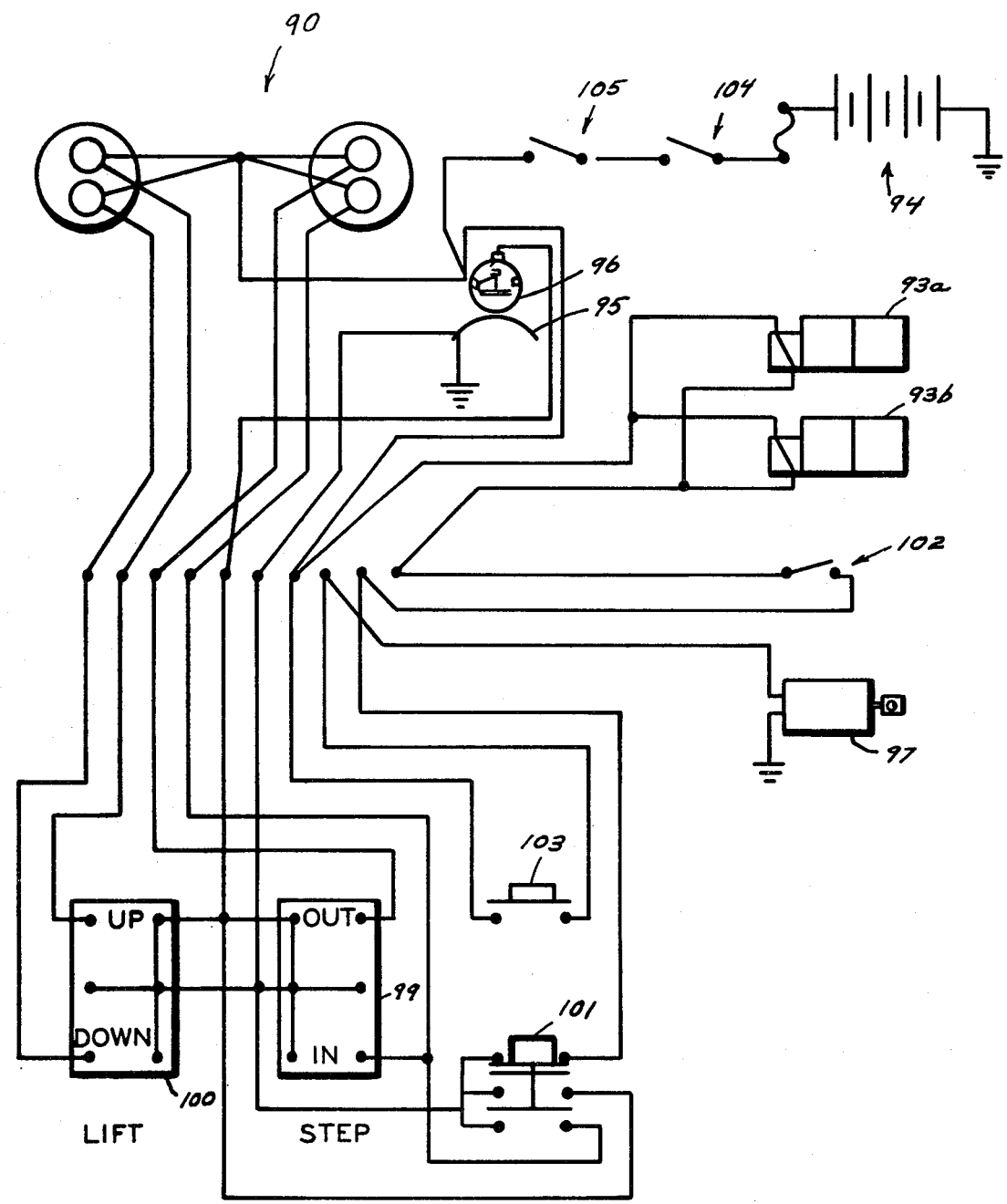
FIG. 32 is a schematic diagram showing the electrical control circuitry.

A schematic flow diagram of the hydraulic system of the earlier embodiment of the invention is shown in FIG. 13. The hydraulic system for the improved automatic lift assembly is shown in FIG. 31. The electrical diagram is shown in FIG. 32. A pump and reservoir 90 is provided with push button controls 99 and 100 (see FIG. 32) to actuate the step control cylinder 24' and lift carriage power unit 49, respectively. Solenoid actuated flow control valves 93a and 93b are provided to selectively actuate the riser safety guard cylinder 75. It is within the scope of the invention to alter the hydraulic control system as desired as long as the same overall operation of automatic lift assembly remains the same. The lift assembly can be powered by a separate 12-volt electric motor driven hydraulic pump and reservoir assembly (commonly called a "power pack") or can be tapped off from the supporting vehicle's power steering system.

Control of the lift function is by a push button or rocker switch actuating the solenoid cartridge valves of conventional design mounted in the pump unit. Switch positions are "up" or "down", and are the momentary contact type requiring pressure on the switch until the desired lift function is completed.

Control of the step operation is also by push button or rocker switch actuating the solenoid cartridge valves of convention design mounted in the pump unit. Switch positions are "in" or "out" and are the momentary contact type requiring pressure on the switch until the desired step function is completed. The control switches can be mounted in the vehicle dash panel, in a control box on the end of an electrical cable or any other position and location desired.

As stated previously, the lift assembly is raised and lowered by a power unit 49 commonly called a steering gear. Within the steering gear is a hydraulic cylinder in which the piston is hydraulically powered to either end of the cylinder. The piston's linear travel is transformed to rotary motion of the output shaft 50 by interference meshed teeth on the piston mating with teeth on the rotary output shaft. Maximum rotary motion of the output shaft 50 is generally 90 degrees.

As stated previously, the rotary output shaft 50 of the power unit 49 is securely engaged to the main pivot actuator shaft 51. The actuator shaft 51 is mounted to the step well and the pivot support arms 56 and 57 are fixedly secured thereto. Rotation of the shaft 51 moves the pivot support arms 56 and 57 up or down which act through connecting links 60 so as to correspondingly move the lift carriage 17. The power unit 49 includes a hydraulically operated piston. Power is applied in both up and down modes with a pressure relief valve limiting the force in the down function. Prior art devices have used linear actuators (hydraulic cylinders) to move arms in the manner described above which at some point leaves the piston rod exposed to the elements. Since the piston rod is the seal surface required to prevent the hydraulic fluid from leaking from the actuator cylinder, if the rod becomes pitted or nicked, it spoils the seal and the unit is disabled. The use of a power unit (steering gear) as described above has many advantages. One, it is sealed to survive in the hostile elements found underneath a vehicle. Two, it has no exposed piston rod. Three, it is a highly reliable product, manufactured in large quantities, and service parts readily available if needed. Four, it has a mechanical rotary input that, when turned manually, axially displaces the hydraulic piston, turning the rotary output shaft and thus manually moving the lift up or down as desired. However, it is within the scope of the invention to use hydraulic cylinders in place of a steering gear if desired.

Movement of the steps is accomplished by using a double acting hydraulic cylinder of conventional design pushing or pulling linkage to extend or retract the folding step, and is controlled by a single valve as described above. There is no interconnection with the step and lift hydraulics, except that they share a common hydraulic power source and reservoir.

Movement of the riser 22 to the raised horizontal platform position is through double acting hydraulic cylinders 75 pushing linkage to displace the riser to approximately the horizontal plane of the lift platform and actuate the safety guard barrier plate. The hydraulic fluid power is directed to these cylinders whenever there is pressure on the "lift" or "up" side of the power unit piston, and is therefore controlled by the lift function control valve. A spring 80 retracts the power cylinder and attendant linkage when it can overcome the hydraulic pressure.

Placed within the hydraulic circuit between the "lift" or "up" side of the power unit piston and the riser control cylinder is an electromagnetic solenoid control valve 93a that is described as a three-way, two position normally closed valve of conventional design. Properly controlled, its function is to prevent hydraulic pressure from reaching the riser control cylinder when the steps and riser are stowed, and/or to release the hydraulic pressure already applied to the ramp/riser cylinder to expedite movement of persons or equipment over the lowered ramp/riser.

Placed within the hydraulic circuit between the step "in" control valve and the operating cylinders for the step is a second electromagnetic solenoid control valve 93b that is described as a three-way, two position normally open valve of convention design. Properly controlled, its function is to release hydraulic pressure from the opposite end of the riser control cylinders 75' when raising the riser, and to apply pressure to the riser control cylinders 75' and step in cylinder 24' which share a common circuit to power "down" the riser and safety guard barrier plate before the steps are retracted and stored.

It is within the scope of the invention to apply a separate and independent power source to raise and lower the riser and safety guard barrier plate as long as the overall operation of the riser and safety guard barrier plate is the same. Placed within the hydraulic circuit between the lift up control valve and up side of the power unit piston and preferably located as close as possible to the power unit is a pilot operated check valve of conventional design, whose function is to stop the flow of oil out of the power unit in the event of hydraulic line failure in the up function. This valve would prevent uncontrolled descent of the lift carriage if failure occurs as described above.

A schematic diagram of the electrical control circuit is shown in FIG. 32. A standard 12-volt battery 94 is utilized to power the circuit. A pump motor 95 is controlled by a pump motor control solenoid 96. A lift stop solenoid 97 and two riser control solenoids 93a and 93b are provided to actuate the lift stop actuating assembly and the riser safety guard barrier plate, respectively.

A step control valve switch 99, a lift carriage control valve switch 100, a riser over-ride switch 101, a riser control switch 102 and a push-button lift carriage safety stop solenoid switch 103 are provided to perform their respective functions as discussed herein. In addition, a master power on-off switch 104 and a door interlock control switch 105 are incorporated into the circuitry. The door interlock control switch 105 prevents operation of the lift carriage when the vehicle doors are closed. As shown in FIG. 15, a control panel 106 is provided near the vehicle operator's station so as to permit operation of the automatic lift assembly by the driver of the vehicle.

One embodiment of the vertical track body guides 19 is shown in FIG. 17 and is incorporated into the improved embodiment of the invention. As stated previously, the vertical body guides 19 are mounted vertically along each side of the door opening. The vertical body guide 19 consists of a channel member which has side walls 107 which are slanted inwardly so as to retentively engage the grooved portion of each of the rollers 18. The rollers 18 are mounted in spaced-apart vertically aligned positions within vertically-oriented channels 108 provided on each side wall of the lift carriage 17. As shown in FIG. 17, the lift carriage mounted channels 18 are in parallel spaced-apart alignment with the vertical body guides 19 so that the rollers 18 extend into operative engagement with the ends of the sidewalls 107 of the vertical body guides 19. Thus positioned, the rollers 18 are in slidable engagement with the vertical guides 19. The rollers 18 selectively move up and down within the body guides 19 as the lift carriage 17 is selectively moved from its intermediate normal step position downwardly to its lowered ground level position and/or upwardly to its raised interior floor level position. The unique slidable retentive engagement of the rollers 18 within the vertical guides 19 provides for greater stability in the vertical movement of the lift carriage 17 within the door opening.

It is thus seen that an improved automatic lift device for use in doorway openings of buildings or of vehicles is provided which is versatile and safe in operation and which is not complicated in design. The relative simplicity of the structure results in each of manufacture, installation and maintenance with resultant savings in costs. The versatility of the instant automatic lift device permits selective manual operation of the unit in the event of failure of the hydraulic and/or electrical systems associated therewith. This feature is of great importance in that the automatic lift device is used by handicapped persons who could not cope physically or emotionally with such failures.

It is also seen that this improvement provides a unitary self-contained upper step, riser and safety guard assembly and actuating apparatus whereby the operation thereof can be tested before installation into the lift carriage.

Further, this improved structure utilizes a riser which remains in its horizontal use position to form an extended platform having an enlarged carrying capacity during the vertical operation of the lift carriage. The incorporation of the safety guard barrier plate, which is automatically actuated when the riser (ramp) is moved to its horizontal use position, eliminates the need for the riser to be inclined vertically to perform a safety guard function. This adds greater versatility to the unit due to the increased capacity of the improved automatic lift assembly.

From this presentation of an operative embodiment of my invention, improvements, modifications and substitutions will become apparent to those skilled in the art. Such improvements, modifications and substitutions are intended to be included within the spirit of the invention limited only by the scope of the hereinafter appended claims.

I claim:
1. In an improved automatic lift assembly for use in vehicle or building doorways comprising:
   a lift carriage movably positioned within a doorway opening, said lift carriage having a substantially U-shaped configuration wherein the base of the lift carriage is adapted to form a lower step portion;
   a movable upper step pivotally positioned within said lift carriage in a normally retracted stowed step use position above and to the rear of said lower step portion, said upper step selectively extendable forwardly and downwardly so as to form a co-planar platform extension of said lower step portion;
   a movable riser provided in pivotal engagement with said upper step so as to selectively extend downwardly to said lower step portion when said upper step is in its retracted stowed step use position within the lift carriage, said riser selectively extendable upwardly and outwardly to form a loading ramp extension from said extended upper step;
   upper step and riser actuating means to selectively extend said upper step forwardly and downwardly so as to form a co-planar platform extension of said lower step portion and to selectively pivotally extend said riser upwardly and outwardly to form a loading ramp extension from said extended upper step;
   lift carriage actuating means to selectively lower said lift carriage to a lowered ground level position and to selectively raise said lift carriage to a raised interior floor level position;
   a safety guard barrier plate provided in pivotal engagement with said movable riser, said safety guard barrier plate adapted to storably retract against said riser along the outer longitudinal edge portion thereof, said safety guard barrier plate selectively extendable to a substantially vertical safety guard position along the outer longitudinal edge of said riser when said riser is actuated to form a horizontal co-planar platform extension of said lower step and movable extended upper step; and
   riser and safety barrier guard plate actuating means in association with said riser and said barrier guard plate so as to automatically raise said safety guard barrier plate to its vertical safety guard position in response to moving said riser to form a horizontal co-planar extension of said lower and upper steps.

2. In the automatic lift assembly of claim 1 wherein said upper step and riser actuating means comprise a self-contained unitary linkage actuating assembly in association with said base of said lift carriage whereby said movable step and riser can be selectively extended and retracted without contact with ancillary support structures.

3. In the automatic lift assembly of claim 2 wherein the said upper step and riser actuating means include at least one actuating cylinder positioned at one side of the said movable upper step and riser, said actuating cylinder pivotally connected at one end to said base of said lift carriage, said actuating cylinder pivotally connected at the other end thereof to self-contained unitary actuating linkage provided in association solely with said movable upper step and riser.

* * * * *